United States Patent
Jadhav et al.

(10) Patent No.: US 12,139,668 B2
(45) Date of Patent: Nov. 12, 2024

(54) LIQUID SUSPENSION COMPOSITION FOR WELLBORE OPERATIONS, AND METHODS OF MAKING AND USING SAME

(71) Applicant: Halliburton Energy Services, Inc., Houston, TX (US)

(72) Inventors: Rahul Jadhav, Stavanger (NO); Gunnar Lende, Stavanger (NO)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 18/131,124

(22) Filed: Apr. 5, 2023

(65) Prior Publication Data
US 2024/0336831 A1 Oct. 10, 2024

(51) Int. Cl.
| | |
|---|---|
| *C09K 8/90* | (2006.01) |
| *C09K 8/035* | (2006.01) |
| *C09K 8/467* | (2006.01) |
| *C09K 8/68* | (2006.01) |
| *C09K 8/80* | (2006.01) |
| *E21B 33/13* | (2006.01) |

(52) U.S. Cl.
CPC ............ *C09K 8/905* (2013.01); *C09K 8/035* (2013.01); *C09K 8/467* (2013.01); *C09K 8/68* (2013.01); *C09K 8/80* (2013.01); *E21B 33/13* (2013.01)

(58) Field of Classification Search
CPC .......... C09K 8/905; C09K 8/467; C09K 8/68; C09K 8/80; E21B 33/13
See application file for complete search history.

(56) References Cited

U.S. PATENT DOCUMENTS

| | | |
|---|---|---|
| 5,874,386 A | 2/1999 | Chan et al. |
| 6,451,743 B1 | 9/2002 | Fox |
| 6,620,769 B1 | 9/2003 | Juppe et al. |
| 6,668,929 B2 | 12/2003 | Griffith et al. |
| 6,743,756 B2 | 6/2004 | Harris, Jr. |
| 7,740,070 B2 | 6/2010 | Santra et al. |
| 7,781,380 B2 | 8/2010 | Lin et al. |
| 7,790,774 B1 | 9/2010 | Kinsey, III et al. |
| 8,415,279 B2 | 4/2013 | Quintero et al. |

(Continued)

FOREIGN PATENT DOCUMENTS

| | | |
|---|---|---|
| EP | 0104795 A2 | 4/1984 |
| EP | 1348832 A1 | 10/2003 |

(Continued)

OTHER PUBLICATIONS

Foreign Communication from Related Application—International Search Report and Written Opinion of the International Searching Authority, International Application No. PCT/US2023/018027, dated Dec. 26, 2023, 10 pages.

(Continued)

*Primary Examiner* — Silvana C Runyan
(74) *Attorney, Agent, or Firm* — Conley Rose, P.C.; Rodney B. Carroll

(57) ABSTRACT

A liquid suspension composition for wellbore operations can include a diutan gum, a viscosifier, and a carrier fluid, wherein the diutan gum is suspended in the liquid suspension composition to form a suspended diutan gum. A wellbore servicing fluid can include the liquid suspension composition, and methods of making and using the wellbore servicing fluid.

24 Claims, 8 Drawing Sheets

(56) References Cited

U.S. PATENT DOCUMENTS

| | | | |
|---|---|---|---|
| 8,517,100 | B2 | 8/2013 | Ali et al. |
| 8,691,737 | B2 | 4/2014 | Chatterji et al. |
| 8,763,705 | B2 | 7/2014 | Ali et al. |
| 9,120,918 | B2 | 9/2015 | Soddemann et al. |
| 9,222,013 | B1 | 12/2015 | Champagne et al. |
| 9,932,513 | B2 | 4/2018 | Suryawanshi et al. |
| 9,969,925 | B2 | 5/2018 | Zhang |
| 10,246,625 | B2 * | 4/2019 | Yoshikawa ............ C09K 8/885 |
| 10,280,360 | B2 | 5/2019 | Champagne et al. |
| 10,370,294 | B2 | 8/2019 | Dighe et al. |
| 10,774,260 | B2 | 9/2020 | Deville et al. |
| 11,091,686 | B2 | 8/2021 | Barral et al. |
| 11,384,624 | B2 | 6/2022 | Eluru et al. |
| 2003/0181532 | A1 | 9/2003 | Parris et al. |
| 2005/0006093 | A1 | 1/2005 | Nguyen |
| 2005/0261038 | A1 | 11/2005 | Robb et al. |
| 2008/0017376 | A1 | 1/2008 | Badalamenti et al. |
| 2009/0008095 | A1 * | 1/2009 | Duncum ................ C09K 8/502 166/276 |
| 2012/0024529 | A1 | 2/2012 | Van Zanten et al. |
| 2012/0152540 | A1 | 6/2012 | Patil et al. |
| 2012/0245060 | A1 * | 9/2012 | Jiang ...................... C09K 8/512 977/773 |
| 2013/0244913 | A1 | 9/2013 | Maberry et al. |
| 2014/0048254 | A1 | 2/2014 | Wolfe |
| 2014/0090843 | A1 | 4/2014 | Boul et al. |
| 2014/0166285 | A1 | 6/2014 | Santra et al. |
| 2014/0202695 | A1 | 7/2014 | Suryawnshi et al. |
| 2014/0318786 | A1 | 9/2014 | Vidma et al. |
| 2014/0326452 | A1 | 11/2014 | Loiseau et al. |
| 2014/0326542 | A1 * | 11/2014 | Dammeyer ............... B66F 9/20 187/234 |
| 2015/0072902 | A1 | 3/2015 | Lafitte et al. |
| 2016/0160109 | A1 | 6/2016 | Patil et al. |
| 2016/0264838 | A1 | 9/2016 | Nelson |
| 2016/0264842 | A1 | 9/2016 | Miller et al. |
| 2017/0130115 | A1 | 5/2017 | Ballard |
| 2018/0346789 | A1 | 12/2018 | Ali et al. |
| 2019/0177603 | A1 | 6/2019 | Abad et al. |
| 2021/0079286 | A1 | 3/2021 | Escobar et al. |
| 2021/0355366 | A1 | 11/2021 | Jadhav et al. |
| 2022/0106864 | A1 | 4/2022 | Patil et al. |
| 2022/0363972 | A1 | 11/2022 | Jones et al. |
| 2023/0031506 | A1 | 2/2023 | Jadhav et al. |

FOREIGN PATENT DOCUMENTS

| | | | |
|---|---|---|---|
| WO | 9941342 | A1 | 8/1999 |
| WO | 2007074330 | A1 | 7/2007 |
| WO | 2007132212 | A2 | 11/2007 |
| WO | 2014167375 | A1 | 10/2014 |
| WO | 2016154363 | A1 | 9/2016 |
| WO | 2020163356 | A1 | 8/2020 |
| WO | 2020209831 | A1 | 10/2020 |
| WO | 2022240458 | A1 | 10/2020 |
| WO | 2021230954 | A1 | 11/2021 |

OTHER PUBLICATIONS

Foreign Communication from Related Application—International Search Report and Written Opinion of the International Searching Authority, International Application No. PCT/US2021/020507, dated Jun. 21, 2021, 11 pages.

Electronic Acknowledgment Receipt, Specification and Drawings for International Application No. PCT/US2021/0020507, entitled "A Wellbore Servicing Fluid and Methods of Making and Using Same," filed Mar. 2, 2021, 70 pages.

Filing Receipt, Specification and Drawings for U.S. Appl. No. 63/025,702, entitled "Wellbore Servicing Fluid and Methods of Making and Using Same," filed May 15, 2020, 53 pages.

Thwala, Justice M. et al., "Rheological Studies of Stability of Colloidal Silica Particles Dispersed in Monoethylene Glycol (MEG) Stabilized by Dodecyl Hexa Ethylene Glycol Monoether (C12E6)," Langmuir, Jul. 23, 2009, vol. 25, No. 22, pp. 12926-12936, American Chemical Society.

Electronic Acknowledgment Receipt, Specification and Drawings for International Application No. PCT/US2022/15171, entitled "A Wellbore Servicing Fluid and Methods of Making and Using Same, " filed Feb. 4, 2022, 55 pages.

Filing Receipt, Specification and Drawings for U.S. Appl. No. 17/587,612, entitled "Wellbore Servicing Fluid and Methods of Making and Using Same," filed Jan. 28, 2022, 71 pages.

Office Action dated Jun. 13, 2022 (22 pages), U.S. Appl. No. 17/188,524, filed Mar. 1, 2021.

Foreign Communication from Related Application—International Search Report and Written Opinion of the International Searching Authority, International Application No. PCT/US2022/015171, dated May 24, 2022, 10 pages.

Foreign Communication from Related Application—International Search Report and Written Opinion of the International Searching Authority, International Application No. PCT/US2019/026362, dated Jan. 6, 2020, 11 pages.

Specification and Drawings for U.S. Appl. No. 17/834,295, entitled "Wellbore Cleaner For Use In Displacement Trains Background," filed Jun. 7, 2022, 22 pages.

Filing Receipt and Specification for U.S. Appl. No. 18/103,140, entitled "Wellbore Cleaning Compositions and Methods of Making and Using Same," filed Jan. 30, 2023, 63 pages.

Filing Receipt and Specification for U.S. Appl. No. 63/356,348, entitled "Wellbore Cleaning Compositions and Methods of Making and Using Same," filed Jun. 28, 2022, 30 pages.

Filing Receipt and Specification for U.S. Appl. No. 18/131,124, entitled "Liquid Suspension Composition for Wellbore Operations, and Methods for Making and Using Same," filed Apr. 4, 2023, 79 pages.

Xinliang Li et al., Poly L arginine as a High-Performance and Biodegradable Shale Inhibitor in Water-Based Drilling Fluids for Stabilizing Wellbore, ACS Sustainable Chemistry & Engineering 2020, pp. 1899-1907.

An IP.com Prior Art Database Technical Disclosure, "Viscous reactive bentonite pill for plug to abandon applications" Disclosed Anonymously, 4 pages.

"Clay Care temporary clay stabilizer" Information Sheet, Baker Hughes, 1 Sheet.

* cited by examiner

LIQUID SUSPENSION COMPOSITION FOR WELLBORE OPERATIONS, AND METHODS OF MAKING AND USING SAME

FIELD

This application relates to a liquid suspension composition for use in conducting wellbore servicing operations. More specifically, this application relates to a liquid suspension composition for use in preparing a wellbore serving fluid, and methods of making and using the liquid suspension composition and the wellbore servicing fluid.

BACKGROUND

Hydrocarbons, such as oil and gas, residing in a subterranean formation or zone are usually recovered using a wellbore servicing fluid during different stages of oil production, such as drilling, cementing, treating a well for initiating production (e.g., stimulation or fracturing), producing oil and gas, and treating for secondary or tertiary oil production operations (e.g., enhanced oil recovery operations).

Generally, there is a need for a liquid suspending agent or viscosity modifying additive that can be used at a low temperature, such as below about 50° C. and up to 150° C. during wellbore servicing operations. Moreover, there is a need for an additional North Sea compliant liquid suspending agent that can provide surface-mixing as well as downhole viscosity modifications to, e.g., a cement slurry or other water based fluids irrespective of temperature.

During plugging operations spaced apart from the bottom of the well, when the difference between cement density and drilling fluid density can be high (e.g., the density of a drilling fluid is typically much lower than a cement slurry), the cement can fall through the lighter fluid after placement rendering the plug job unsuccessful. Thus, there is a need to thicken the fluid (e.g., spacer fluid) located between the cement slurry and the underlying drilling fluid to prevent the falling of the cement post-placement. The most common approach for mitigation is to place a viscous aqueous bentonite pill (referred to as "HiVis" pill) below the intended plug depth to act as a support medium for the cement slurry. The viscous bentonite pill can be placed below the intended plug depth to act a support medium or barrier for the cement slurry, which minimizes the risk of intermixing of the cement slurry and wellbore fluid by limiting or preventing fall-through. The efficiency of the viscous bentonite pill can strongly depend on the viscosity of the pill itself. The viscosity of the bentonite pill can increase when in contact with the water-based mud, and even more when in contact with the cement slurry. However, such bentonite pills can have loading limitations impeding mixing and pumping if certain viscosity limits are exceeded.

Thus, there is a need for a viscosity modifying additive (e.g., a liquid suspension composition) for a wellbore servicing fluid having multiple applications at low temperatures, and effective for placement (e.g., via pill applications) of the wellbore servicing fluid in a wellbore penetrating a subterranean formation. One solution can be to make this fluid or a fluid modified with such a composition responsive to water so that it will become substantially more viscous when contacting a water based cement slurry placed as plug on top of such a pill.

BRIEF DESCRIPTION OF DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
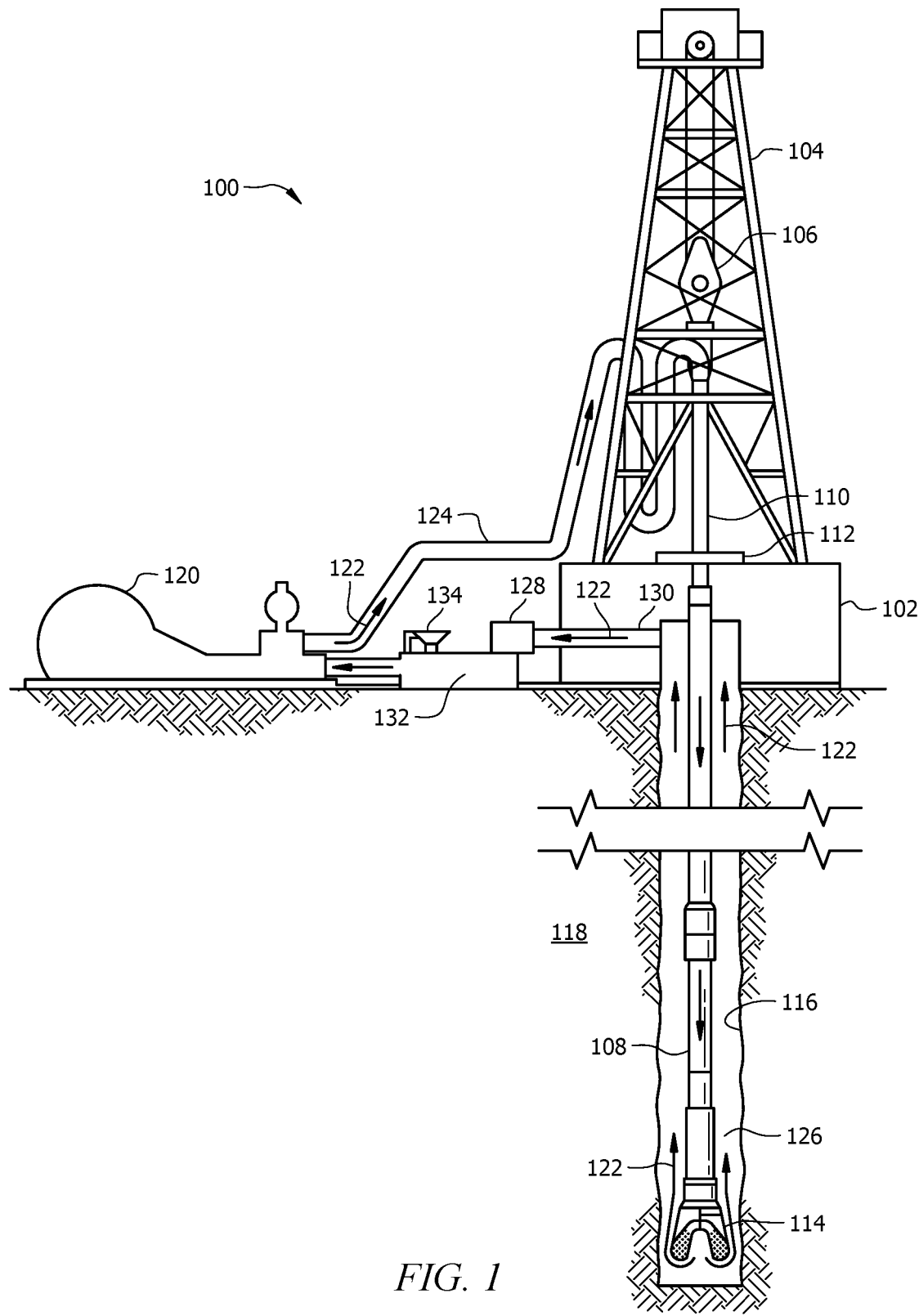
FIG. 1 is a schematic depiction of a wellbore operational environment.

In the following detailed description of the illustrative embodiments, reference is made to the accompanying drawings that form a part hereof. These embodiments are described in sufficient detail to enable those skilled in the art to practice the invention, and it is understood that other embodiments may be utilized, and that logical structural, mechanical, electrical, and chemical changes may be made without departing from the spirit or scope of the invention. To avoid detail not necessary to enable those skilled in the art to practice the embodiments described herein, the description may omit certain information known to those skilled in the art. The following detailed description is, therefore, not to be taken in a limiting sense, and the scope of the illustrative embodiments is defined only by the appended claims.

Substantially similar or identical elements in the drawings may be identified by the same numeral to reduce redundancy.

As used herein, the term "fluid path" can be a path formed by a wellbore and can be used for the production of fluids, such as hydrocarbons and water, or be used for the injection of fluids, such as water, carbon dioxide, and natural gas, e.g., methane.

As used herein, the term "base fluid" or "bulk fluid" refers to the major component of a fluid, (e.g., equal to or greater than about 50, about 55, about 60, about 65, about 70, about 75, about 80, about 85, or about 90 weight percent), such as a wellbore servicing fluid, (as opposed to components dissolved and/or suspended therein) and does not indicate any particular condition or property of that fluid such as its mass, amount, pH, or other properties.

As used herein, the term "substantially constant" such as a substantially constant amount, can mean within about 10%, about 5%, or even about 1% of the referenced item, such as within about 10%, about 5%, or even about 1%, by weight, of an amount.

As used herein, the term "coupled" can mean two items, directly or indirectly, joined, fastened, associated, connected, communicated, or formed integrally together either by chemical or mechanical means, by processes including extruding, stamping, molding, or welding. What is more, two items can be coupled by the use of a third component such as a mechanical fastener, e.g., a screw, a nail, a staple, or a rivet; an adhesive; or a solder.

As used herein, the term "and/or" can mean one or more of items in any combination in a list, such as "A and/or B" means "A, B, or the combination of A and B".

As used herein, the term "encapsulation" and variants thereof do not imply any particular degree of encapsulation or coating, whether partial or otherwise.

It is to be understood that "subterranean formation" encompasses both areas below exposed earth and areas below earth covered by water such as ocean or fresh water. Herein in the disclosure, "top" means the well at the surface (e.g., at the wellhead which may be located on dry land or below water, e.g., a subsea wellhead), and the direction along a wellbore towards the well surface is referred to as "up"; "bottom" means the end of the wellbore away from the surface, and the direction along a wellbore away from the wellbore surface is referred to as "down." For example, in a horizontal wellbore, two locations may be at the same level (i.e., depth within a subterranean formation), the location closer to the well surface (by comparing the lengths along the wellbore from the wellbore surface to the locations) is referred to as "above" the other location, the location farther away from the well surface (by comparing the lengths along the wellbore from the wellbore surface to the locations) is referred to as "below" or "lower than" the other location.

As used herein, the terms "treat," "treatment," "treating," and grammatical equivalents thereof refer to any subterranean operation that uses a fluid in conjunction with achieving a desired function and/or for a desired purpose. Use of these terms does not imply any particular action by the treatment fluid or wellbore servicing fluid. Illustrative treatment operations can include, for example, drilling operations, completion operations, cementing operations, fracturing operations, gravel packing operations, acidizing operations, scale dissolution and removal, consolidation operations, and the like. For example, a fluid may be used to drill a well bore in a subterranean formation or to complete a well bore in a subterranean formation, as well as numerous other purposes.

As used herein, a drilling fluid, or "mud" which a drilling fluid is also often called, is a wellbore servicing fluid that is circulated in a well bore as the well bore is being drilled to facilitate the drilling operation. The various functions of a drilling fluid include removing drill cuttings from the well bore, cooling and lubricating the drill bit, aiding in support of the drill pipe and drill bit, and providing a hydrostatic head to maintain the integrity of the well bore walls and prevent well blowouts.

The present disclosure relates to compositions that are useful as additives in wellbore servicing fluids (also referred to as wellbore treatment fluids or simply treatment fluids) for various operations, such as drilling, treating a well for oil production (e.g., hydraulic fracturing), cementing, producing hydrocarbons, and secondary or enhanced oil recovery operations. Particularly, the composition can be an additive to increase viscosity of a wellbore servicing fluid, e.g., a liquid suspension composition. In some embodiments, a liquid suspension composition for wellbore operations can include a diutan gum; a viscosifier; and a carrier fluid. Typically, the diutan gum is suspended in the liquid suspension composition to form a suspended diutan gum. In some embodiments, the liquid suspension composition may further include a salt, and the salt can include an alkali metal salt, an alkaline metal salt, a formate salt, a chloride salt, or a combination thereof. In some embodiments, the salt can be sodium formate, potassium formate, cesium formate, sodium acetate, potassium acetate, cesium acetate, calcium chloride, or a combination thereof. If the salt is calcium chloride, the diutan gum can remain partially hydrated. In some embodiments, the salt does not include, calcium chloride, calcium bromide, sodium chloride, sodium bromide, or any combination thereof.

Although not wanting to be bound by theory, in some embodiments, the salt, e.g., sodium or potassium formate, dissociates in the carrier fluid into a molecular anion (e.g., $HCOO^-$) and an atomic cation (e.g., $Na^+$ or $K^+$). The diutan gum in the carrier fluid cannot hydrate in the presence of disassociated salt and instead becomes suspended in the carrier fluid while the viscosifier, e.g., xanthan gum, hydrates. In some embodiments, the salt, e.g., potassium formate, can act as a diutan gum hydration inhibitor. Generally, a salt disassociating into a molecular anion and an atomic cation can be more effective as a diutan gum hydration inhibitor than a salt, e.g., sodium chloride, disassociating into an atomic cation and an atomic anion. Thus, the diutan gum can remain suspended in the liquid suspension composition. Contacting a sufficient amount of a fluid, which in some embodiments can contain water, with the liquid suspension composition can hydrate the diutan gum. In some embodiments, a sufficient amount of fluid to hydrate can be at least about 10%, about 15%, about 20%, about 25%, about 30%, about 35%, or about 40% volume of water or other aqueous fluid divided by the volume of the liquid suspension composition (vol/vol) multiplied by 100 to obtain a percentage. In some other embodiments, a sufficient amount of fluid to hydrate the diutan can be at about 20% to about 40% vol/vol or about 25% to about 35% vol/vol. However, the diutan gum in the liquid suspension composition is typically not activated by temperature or pH changes. The suspended diutan gum can be activated, e.g., hydrated, by contacting the liquid suspension composition with a sufficient amount of fluid (e.g., an aqueous base fluid). Upon activation, the hydrated diutan gum can serve as a viscosifier and/or a suspension agent (e.g. aiding suspension of particulate material) in a wellbore servicing fluid or a treatment fluid. The hydrated diutan gum in the wellbore servicing fluid can act as a viscosifier and/or a suspension agent, and the resultant wellbore servicing fluid can be used for a variety of wellbore services.

In some embodiments, the carrier fluid can include an aqueous fluid. Aqueous fluids that may be suitable for use in the methods and systems may include water from any source. Such aqueous fluids may include fresh water, salt water (e.g., water containing one or more salts dissolved therein), brine (e.g., saturated salt water), seawater, or any combination thereof. In many embodiments, the aqueous fluids include one or more ionic species, such as those formed by salts dissolved in water. For example, seawater and/or produced water may include a variety of divalent cationic species dissolved therein. In some embodiments, the density of the aqueous fluid can be adjusted, among other purposes, to provide additional particulate transport and suspension in the compositions. In some embodiments, the pH of the aqueous fluid may be adjusted (e.g., by a buffer or other pH adjusting agent) to a specific level, which may depend on, among other factors, the types of viscosifying agents, acids, and other additives included in the fluid. One of ordinary skill in the art, with the benefit of this disclosure, will recognize when such density and/or pH adjustments are appropriate. In some embodiments, the wellbore servicing fluid may include a mixture of one or more aqueous fluids with other fluids and/or gases, including but not limited to emulsions, foams, and the like. In some embodiments, the carrier fluid may include an aqueous fluid and a salt including potassium formate.

In some embodiments, the viscosifier can include a guar gum, a xanthan gum, a welan gum, a hydroxyethyl cellulose, a modified cellulose or a derivative thereof, a diatomaceous earth, a starch, a modified starch, a crosslinked starch, a viscoelastic surfactant, an attapulgite clay, or a combination thereof. In some embodiments, the viscosifier can include one or more viscosifiers. The viscosifier can include a biopolymer, a polysaccharide, particularly a xanthan gum and/or a diutan gum, a synthetic polymer, minerals, or a combination thereof. The minerals can include sepiolite, attapulgite, bentonite, sodium bentonite, montmorillonite, beidellite, nontronite, hectorite, samonite, smectite, kaolinite, serpentine, illite, chlorite, montmorillonite, saponite, fuller's earth, attapulgite, laponite, or a combination thereof. In some embodiments, the viscosifier includes a hydroxyethyl cellulose, a hydroxy-propyl guar, a carboxy-methylhydroxy-propyl guar, one or more modified polysaccharides, a partially hydrolyzed polyacrylamide (PHPA), a carboxymethylcellulose, a polyanionic cellulose, a guar gum, a locust bean gum, a Karaya gum, a gum tragacanth, one or more hydrophobically modified guars, one or more high-molecular weight polysaccharides composed of mannose and galactose sugars, one or more heteropolysaccharides obtained by the fermentation of starch-derived sugars, xanthan, one or more pectins, diutan, welan, gellan, scleroglucan, chitosan, dextran, one or more substituted or unsubstituted galactomannans, a starch, a cellulose, one or more cellulose ethers, one or more carboxycelluloses, a hydroxypropyl cellulose, one or more carboxyalkylhydroxyethyl celluloses, a carboxymethyl hydroxyethyl cellulose, a methyl cellulose, a sodium polyacrylate, a polyacrylamide, a partially hydrolyzed polyacrylamide, a polymethacrylamide, a poly(acrylamido-2-methyl-propane sulfonate), a poly(sodium-2-acrylamide-3-propylsulfonate), one or more copolymers of acrylamide and acrylamido-2-methyl-propane sulfonate, one or more terpolymers of acrylamido-2-methyl-propane sulfonate, an acrylamide and vinylpyrrolidone or itaconic acid, sepiolite, attapulgite, or a combination thereof.

In some embodiments, the viscosifier can include a xanthan gum, and the suspended diutan gum may not be substantially hydrated and the xanthan gum may substantially be hydrated in the carrier fluid, or the suspended diutan gum can be at least partially hydrated in the carrier fluid and the xanthan gum can be substantially hydrated in the carrier fluid. In some embodiments, the diutan does not substantially hydrate in brines of potassium formate, cesium formate, calcium chloride, or a combination thereof. As an example, the diutan does not substantially hydrate in brine in amount of no more than about 1.0% weight of hydrated diutan per volume of brine (wt/vol times 100%), about 0.75% wt/vol, about 0.50% wt/vol, or about 0.25% wt/vol based on the hydration of diutan obtained in fresh water, as described below.

In some embodiments, the viscosifier has a number average molecular weight in a range of from about 1.2 million (MM) atomic mass unit (Da) to about 5 MM Da, from about 1.5 MM Da to about 4.5 MM Da, or from about 2 MM Da to about 4 MM Da.

In some embodiments, the liquid suspension composition can have the suspended diutan gum in an amount from about 1 to about 50 weight percent, about 2 to about 30 weight percent, or about 5 to about 15 weight percent based on the total weight of the liquid suspension composition. In some embodiments, the viscosifier can be in an amount from about 0.1 to about 20 weight percent, about 0.5 to about 10 weight percent, or about 0.5 to about 5 weight percent based on the total weight of the liquid suspension composition.

Usually, the diutan gum can be a strong water viscosifier, but does not hydrate in the liquid suspension composition in the presence of a brine such as sodium, cesium, or potassium formate, even after conditioning for 24 hours at 212° F. However, the diutan gum can hydrate and provide viscosity if the liquid suspension composition is diluted in water or sea water, other monovalent or divalent brines, or in when added to a wellbore servicing fluid (e.g., drilling fluid, fracturing fluid, cement slurry) once a water threshold is crossed.

In some embodiments, the liquid suspension composition can have a specific gravity of from about 0.5 to about 2.3 and, independently, an initial Brookfield viscosity of no more than about 500 centipoise (cP) at 24 degrees Celsius (° C.) and 100 revolutions per minute (rpm). In some embodiments, the liquid suspension composition can have an initial Brookfield viscosity of no more than about 400 cP at 24° C. and 100 rpm and, independently, an initial a Brookfield viscosity of no more than about 300 cP at 24° C. and 100 rpm. In some embodiments, the liquid suspension composition can remain suspended without visually perceptible component separation for at least about 45 days, about 90 days, about 120 days, or even about 180 days. In some embodiments, the liquid suspension composition can have an aerobic degradability of at least 21% after 28 days in seawater according to the Marine Bodis test as defined in Modified ISO 10708 test for the Marine Environment using guidance in the HOCNF guidelines (OSPAR Agreement: 2012/05. Update 2015), and thus be North Sea compliant.

In some embodiments, a liquid suspension composition can have a diutan gum; a viscosifier; and a carrier fluid, and optionally a salt. Generally, the liquid suspension composition may be prepared using any suitable method and/or equipment, such as one or more blenders, mixers, or stirrers, in any order. The diutan gum, viscosifier, carrier fluid, and optionally a salt may be combined in any suitable order using any suitable method and equipment.

In some embodiments, the viscosifier and carrier fluid can be combined first. Afterwards, the diutan gum can be added to the combination and thereby the diutan gum can be suspended in the liquid suspension composition. In some embodiments, the order can be reversed. In some embodiments, a salt, such as sodium or potassium formate, can be added to the carrier fluid thereby forming a brine. The brine can subsequently be added to the viscosifier to form a mixture, and then afterwards, the diutan gum can be added to the mixture. Although not wanting to be bound by theory, the diutan gum may be suspended in the mixture and the salt in the brine can serve as diutan gum hydration inhibitor. Generally, the liquid suspension composition may be prepared using any suitable method and/or equipment, such as one or more blenders, mixers, or stirrers.

A wellbore servicing fluid can be used in a variety of wellbore operations such as drilling, treating, cementing, fracturing, producing, and secondary or enhanced oil recovery. In some embodiments, a wellbore servicing fluid may include the liquid suspension composition having a diutan gum; a viscosifier; and a carrier fluid and a base fluid. In one or more embodiments, the wellbore servicing fluid includes a base fluid. A base fluid suitable for use in the wellbore servicing fluid may include a solvent, a mutual solvent, or both. In one or more embodiments, the base fluid includes at least one solvent. The solvent may be an oleaginous fluid, a polar solvent, an aqueous fluid, or a combination thereof.

In one or more embodiments, the base fluid includes an oleaginous fluid. In one or more embodiments, the oleaginous fluid includes any petroleum oil, natural oil, synthetically-derived oil, mineral oil, base oil that is used to make an oil-based drilling fluid, a terpene, such as d-limonene, a hydrocarbon, or a combination thereof. The oleaginous fluid may be included in the wellbore servicing fluid in an amount of from about 30 weight percent (wt. %) to about 90 wt. %, from about 40 wt. % to about 80 wt. %, or from about 50 wt. % to about 70 wt. % based on the total weight of the wellbore servicing fluid.

In one or more embodiments, the base fluid includes at least one polar solvent. Nonlimiting examples of polar solvents suitable for use in the wellbore servicing fluid include butyl alcohol, pentanol, branched and linear hexanol, 2-ethylhexanol, 1-heptanol, 2-heptanol, octanol, one or more $C_6$ to $C_{13}$ alkyl alcohols, one or more diols, n-butyl lactate, isobutyl lactate, 2,2,4-trimethyl-1,3-pentanediol monoisobutyrate, butyl 2-hydroxybutyrate, or a combination thereof. The polar solvent may be included in the wellbore servicing fluid in an amount of from about 0.5 wt. % to about 50 wt. %, from about 1 wt. % to about 40 wt. %, or from about 2 wt. % to about 30 wt. % based on the total weight of the wellbore servicing fluid.

In some embodiments, the base fluid includes an aqueous fluid. Aqueous fluids that may be suitable for use in the wellbore servicing fluid may include water from any source. Such aqueous fluids may include fresh water, salt water (e.g., water containing one or more salts dissolved therein), brine (e.g., saturated salt water), seawater, and/or any combination thereof. The aqueous fluids may be from a source that does not contain compounds that adversely affect other components of a fluid. The aqueous fluid may be included in the wellbore servicing fluid in an amount of from about 0 to about 30 wt. %, from about 1 wt. % to about 20 wt. %, or from about 2 wt. % to about 10 wt. % based on the total weight of the wellbore servicing fluid.

In some embodiments, a brine can have a density in the range of from about 9 to about 20 pounds per gallon (lb/gal or "ppg") (from about 1078 to about 2396 kilogram per meter cubed (kg/m$^3$)), from about 9 to about 19.2 lb/gal (from about 1078 to about 2301 kg/m$^3$), from about 9.5 to about 19.2 ppg (from about 1138 to about 2301 kg/m$^3$), or from about 9 to about 18 ppg (from about 1078 to about 2157 kg/m$^3$). In some embodiments, the brine has a density of greater than or equal to about 9, about 9.5, about 10, about 10.5, about 11, about 11.5, about 12, about 12.5, about 13, about 13.5, about 14, about 14.5, about 15, about 15.5, about 16, about 16.5, about 17, about 17.5, or about 18 ppg (greater than or equal to about 1078, about 1138, about 1198, about 1258, about 1318, about 1378, about 1438, about 1498, about 1558, about 1618, about 1678, about 1738, about 1798, about 1858, about 1917, about 1977, about 2037, about 2097, or about 2157 kg/m$^3$).

In some embodiments, the base fluid includes at least one mutual solvent. Herein a mutual solvent is defined as a material that is soluble in oil, water, and acid-based fluids. Given that the mutual solvent is miscible with more than one class of liquids, such materials may also be referred to as coupling agents because such materials can cause two ordinarily immiscible liquids to combine with each other. In some embodiments, the mutual solvent includes methanol, ethanol, n-propanol, isopropyl alcohol (IPA), butyl alcohol, methyl glycolate, ethyl glycolate, n-propyl glycolate, isopropyl glycolate, methyl lactate, ethyl lactate, n-propyl lactate, isopropyl lactate, ethylene glycol monobutyl ether, diethylene glycol monobutyl ether, triethylene glycol monobutyl ether, propylene glycol monobutyl ether (PGMBE), dipropylene glycol monobutyl ether, tripropylene monobutyl ether, diethylene glycol monoethyl ether, dipropylene glycol monomethyl ether, butylcarbitol, ethers or esters of glycols, glycerol, polyglycerol, polyols, derivatives thereof or, a combination thereof. In an embodiment, the mutual solvent includes ethylene glycol monobutyl ether (EGMBE). The mutual solvent may be included in the wellbore servicing fluid in an amount of from about 5 wt. % to about 70 wt. %, from about 10 wt. % to about 60 wt. % or from about 15 wt. % to about 50 wt. % based on the total weight of the wellbore servicing fluid.

A wellbore servicing fluid of the present disclosure may be characterized by effectiveness across a broad pH range. For example, the wellbore servicing fluid may have a pH ranging from about 4 to about 13, from about 8 to about 10, from about 10 to about 13, greater than about 4.5 to less than about 7, from about 5 to about 6.5, or from about 5 to about 6.0. Any suitable methodology may be utilized to adjust the pH of the wellbore servicing fluid to the disclosed ranges. For example, the pH may be adjusted through the use of any acid or base compatible with the other components of the wellbore servicing fluid.

In some embodiments, the pH of the aqueous fluid may be adjusted (e.g., by a buffer or other pH adjusting agent) to a specific level, which may depend on, among other factors, the types of viscosifying agents, acids, and other additives included in the fluid. One of ordinary skill in the art, with the benefit of this disclosure, will recognize when such density and/or pH adjustments are appropriate. In some embodiments, the wellbore servicing fluids may include a mixture of one or more aqueous fluids with other fluids and/or gases, including but not limited to emulsions, foams, and the like.

In some embodiments, the wellbore servicing fluid may include from about 0.1 to about 25 weight percent (wt. %) of the diutan gum (e.g., diutan gum that was suspended in the liquid suspension composition and becomes activated via hydration in the wellbore servicing fluid), from about 0.5 to about 20 wt. %, or from about 1 to about 15 wt. %, based on the total weight of the wellbore servicing fluid. In some embodiments, the wellbore service fluid can further include a particulate material selected from the group consisting of a cementitious material, a proppant, a weighting agent, drill cuttings, or any combination thereof. In some embodiments, the wellbore servicing fluid can include an amount of a base fluid effective to hydrate the diutan gum to form a hydrated diutan gum, and the hydrated diutan gum can be present in the wellbore servicing fluid in an amount effective to suspend the particulate material.

In some embodiments, the wellbore servicing fluid can be used for creating a spacer composition or pill, e.g., for cementing operations. The wellbore servicing fluid can include a liquid suspension composition having a diutan gum, a viscosifier, a carrier fluid, and other optional ingredients, and a base fluid. In some embodiments, the base fluid can include fresh water, salt water, brine, seawater, water-based drilling fluid, non-aqueous drilling fluid or a combination thereof, and the base fluid may be present in the wellbore servicing fluid in an amount effective to substantially hydrate the suspended diutan gum to form a viscosified pill. In some embodiments, the wellbore servicing fluid comprises from about 0.5 to about 25 weight percent of the diutan gum based on the weight of the wellbore servicing fluid, about 1 to about 15 weight percent of the diutan gum based on the weight of the wellbore servicing fluid, or about 2 to about 8 weight percent of the diutan gum based on the weight of the wellbore servicing fluid, and independently, the wellbore servicing fluid can include from about 1 to about 100 weight percent of the liquid suspension composition based on the weight of the wellbore servicing fluid, about 10 to about 100 weight percent of the liquid suspension composition based on the weight of the wellbore servicing fluid, or about 50 to about 100 weight percent of the liquid suspension composition based on the weight of the wellbore servicing fluid. In some embodiments, the viscous water swellable pill can include a defoamer.

A viscous water swellable pill can be manufactured by a simple process performed in a bulk plant or offshore. Pill viscosity can be adjusted by tweaking the concentration of a defoamer and diutan gum. Similarly, pill density can be adjusted by adding one or more weighting agents or density reducing agents such as hollow glass beads.

In some embodiments, a variety of additives may be optionally included in the pill. Suitable additives may include, but are not limited to, foaming agents, particulates, inhibitors, bridging agents, fluid loss control agents, and any other suitable additives that do not detrimentally affect the pill.

In some embodiments, the pill may be foamed. One advantage of using a foamed pill over a non-foamed version is that less of the aqueous fluid may be used, relatively speaking. This may be important in subterranean formations that are water-sensitive or under pressure. In some embodiments, the foamed pills have a foam quality of about 30% or above. These foams may include commingled fluids. A preferred foam quality level is about 50% or above.

When the pill is foamed, the pill may comprise an additional surfactant. The choice of whether to use an additional surfactant will be governed at least in part by the mineralogy of the formation and the composition of the viscoelastic surfactant. As will be understood by those skilled in the art, anionic, cationic, nonionic, or amphoteric surfactants also may be used so long as the conditions that they are exposed to during use are such to display the desired foaming properties. For example, in some embodiments, mixtures of cationic and amphoteric surfactants may be used. When used in some pill embodiments, the surfactant is present in an amount of from about 0.01% to about 5% by volume. When foamed, the base fluid may comprise a gas. While various gases can be utilized for foaming the pills, nitrogen, carbon dioxide, and mixtures thereof are preferred. In examples of such embodiments, the gas may be present in a base fluid and/or a delayed tackifying composition in an amount in the range of from about 5% to about 95% by volume, and more preferably in the range of from about 20% to about 80% by volume. The amount of gas to incorporate into the fluid may be affected by factors including the viscosity of the fluid and bottomhole pressures involved in a particular application. Examples of preferred foaming agents that can be utilized to foam the base fluid and/or the delayed tackifying composition include, but are not limited to, alkylamidobetaines such as cocoamidopropyl betaine, alpha-olefin sulfonate, trimethyltallowammonium chloride, $C_8$ to $C_{22}$ alkylethoxylate sulfate, and trimethylcocoammonium chloride. Other suitable foaming agents and foam-stabilizing agents may be included as well, which will be known to those skilled in the art with the benefit of this disclosure. The foaming agent is generally present in a pill for some embodiments in an amount in the range of from about 0.01% to about 5%, by volume, more preferably in the amount of from about 0.2% to about 1%, by volume, and most preferably about 0.6%, by volume.

The wellbore servicing fluid can further include solids such as a particulate material, and the wellbore servicing fluid may benefit and be aided in its intended use via effective suspension of the particulate material therein through addition of the liquid suspension compositions disclosed herein. The particulate material can be any suitable material for a variety of wellbore operations.

In some embodiments, the wellbore servicing fluid (e.g., a pumpable cement flurry) can include the particulate material, which may include a cementitious material, and independently, the wellbore servicing fluid may include an effective amount of base fluid to hydrate the suspended diutan gum and suspend the cementitious material. In some embodiments, the wellbore servicing fluid is a pumpable cementitious composition or slurry comprising suspended particular material, e.g., suspended cementitious material in a pumpable slurry. Generally, the cementitious material may be a Portland cement, a pozzolana cement, a gypsum cement, a shale cement, an acid cement, a base cement, a phosphate cement, a high alumina content cement, a slag cement, a silica cement, a high alkalinity cement, a magnesia cement, lime, or a combination thereof. In some embodiments, the cementitious material can be present in the wellbore servicing fluid in an amount of from about 1% to about 85% based on a total weight of the wellbore servicing fluid, about 10% to about 60% based on a total weight of the wellbore servicing fluid, or about 20% to about 40% based on a total weight of the wellbore servicing fluid. The wellbore servicing fluid can include an effective amount of base fluid to hydrate the suspended diutan gum, and independently, the base fluid may be present in an amount sufficient to form a pumpable cement slurry with the cementitious material.

In some embodiments, the base fluid can be present in an amount of at least about 15 liter of water per 100 kilogram weight of the cementitious material. In some embodiments, the wellbore servicing fluid comprises from about 0.5 to about 50 wt. % of the suspended diutan gum (e.g., cement slurry), about 2 to about 30 wt. % of the suspended diutan gum based on the weight of the wellbore servicing fluid (e.g., cement slurry), or about 5 to about 15 wt. % of the suspended diutan gum based on the total weight of the wellbore servicing fluid (e.g., cement slurry), and independently, the wellbore servicing fluid can include from about 1 to about 100 weight percent of the liquid suspension composition (e.g., cement slurry), about 10 to about 100 weight percent of the liquid suspension composition (e.g., cement slurry), or about 50 to about 100 weight percent of the liquid suspension composition based on the total weight of the wellbore servicing fluid (e.g., cement slurry).

Usually, the wellbore servicing fluid in some embodiments is operable at a temperature of from about 0° C. to about 150° C. In some embodiments, the wellbore servicing fluid can further include a defoamer, a retarder, an accelerator, a fluid loss control additive, a dispersant, a viscosifier, a thixotropic additive, a silica compound or a combination thereof. The viscosifier can include those described above.

In some embodiments, the wellbore servicing fluid comprises a cement blend. The cement blend can comprise, consist essentially of, or consist of a cementitious material. The cementitious material can comprise the materials described above.

In some embodiments, the cement blend further comprises an expansion agent, which may be any material that that creates an increase in volume of the cement in fluid, gel or hardened state by chemical reactions such as by gas forming. Examples of expansion agents can include an aluminum powder, one or more gypsum blends, a lightly burned magnesium oxide, a hard burned magnesium oxide, a deadburned magnesium oxide or a combination thereof. In some embodiments, the expansion agent is present in the cement blend in an amount of from about 1% BWOB to about 10% BWOB based on a total weight of the cement blend, from about 1.5% BWOB to about 7.5% BWOB, or from about 2% BWOB to about 5% BWOB.

In some embodiments, the cement blend further comprises one or more cement blend additives. The one or more cement blend additives can comprise a quartz flour, a bulk flow enhancer, an aggregate, a fly ash, or a combination thereof. In some embodiments, the one or more cement blend additives are present in the cement blend in an amount of from about 5% BWOB to about 95% BWOB based on a total weight of the cement blend, from about 5% BWOB to about 80% BWOB, or from about 15% BWOB to about 40% BWOB.

In some embodiments, the wellbore servicing fluid further includes a weighting agent and/or a weight-reducing agent. In some embodiments, a weighting agent and/or a weight-reducing agent may be included within the cement blend (e.g., as part of a dry cement blend or dry cementitious composition) prior to formation of a wellbore servicing fluid by mixing the cement blend with water to form a pumpable cement slurry. A suitable weighting agents can include barium sulfate, (i.e., barite), iron oxide (i.e., hematite), manganese oxide (i.e., hausmannite), ilmenite, or a combination thereof. Suitable weight-reducing agents can include hollow glass and ceramic beads. In some embodiments, the weighting agent or the weight-reducing agent is present in the wellbore servicing fluid in an amount of from about 1% BWOB to about 200% BWOB, or from about 10% BWOB to about 100% BWOB based on a total weight of the cement blend.

In some embodiments, the wellbore servicing fluid further comprises one or more additives. The one or more additives may comprise a free fluid control additive, an acid, a base, an emulsifier, a corrosion inhibitor, a mutual solvent, a conventional breaking agent, a relative permeability modifier, a lime, a gelling agent, a crosslinker, a flocculant, a water softener, a proppant, an oxidation inhibitor, a thinner, a scavenger, a lubricant, a friction reducer, a bridging agent, a vitrified shale, a surfactant, a scale inhibitor, a clay, a clay control agent, a clay stabilizer, a silicate-control agent, a biostatic agent, a storage stabilizer, a filtration control additive, a foaming agent, a foam stabilizer, one or more latex emulsions, a formation conditioning agent, one or more elastomers, one or more of a gas or a fluid absorbing materials, one or more resins, one or more superabsorbers, one or more mechanical property modifying additives, and the like, or a combination thereof.

In some embodiments, the wellbore servicing fluid (e.g., a fracturing fluid) can include the particulate material, which may include a proppant, and independently, the wellbore servicing fluid may include an effective amount of base fluid to hydrate the suspended diutan gum and suspend the proppant. In some embodiments, the wellbore servicing fluid can include from about 1 to about 50 weight percent of the diutan gum based on the weight of the wellbore servicing fluid (e.g., fracturing fluid), about 2 to about 30 weight percent of the diutan gum based on the weight of the wellbore servicing fluid (e.g., fracturing fluid), or about 5 to about 15 weight percent of the diutan gum based on the weight of the wellbore servicing fluid (e.g., fracturing fluid), and independently, the wellbore servicing fluid can include from about 1 to about 100 weight percent of the liquid suspension composition based on the weight of the wellbore servicing fluid (e.g., fracturing fluid), about 10 to about 100 weight percent of the liquid suspension composition based on the weight of the wellbore servicing fluid (e.g., fracturing fluid), or about 50 to about 100 weight percent of the liquid suspension composition based on the weight of the wellbore servicing fluid (e.g., fracturing fluid).

In some embodiments, the proppant particles are generally of a size such that formation particulate solids that migrate with produced fluids are prevented from being produced from the subterranean zone. Various kinds of proppant particles can be utilized including graded sand, bauxite, ceramic materials, glass materials, polymer materials, TEFLON® materials, nut shell pieces, walnut hulls, polymer beads, cured resinous particulates comprising nut shell pieces, seed shell pieces, cured resinous particulates including seed shell pieces, fruit pit pieces, cured resinous particulates comprising fruit pit pieces, wood, composite particulates, or a combination thereof. Generally, the proppant particles have a size in the range of from about 2 to about 400 mesh, U.S. Sieve Series.

In some embodiments, the wellbore servicing fluid (e.g., a drilling fluid) can include a particulate material including a weighting agent, drill cuttings, or both, and independently, the wellbore servicing fluid can include an effective amount of a base fluid to hydrate the suspended diutan gum and suspend the weighting agent, drilling cuttings, or both. In some embodiments, the wellbore servicing fluid can include from about 1 to about 50 weight percent of the diutan gum, about 2 to about 30 weight percent of the diutan gum, or about 5 to about 15 weight percent of the diutan gum based on the weight of the wellbore servicing fluid (e.g., drilling fluid), and independently, the wellbore servicing fluid can include from about 1 to about 100 weight percent, about 10 to about 100 weight percent, or about 50 to about 100 weight percent of the liquid suspension composition based on the weight of the wellbore servicing fluid (e.g., drilling fluid). In some embodiments, the drilling fluid can include an aqueous fluid, as discussed above.

Often, the drilling fluid, or drilling fluid composition can include a modified starch and a bridging agent including a calcium carbonate, a magnesium carbonate, a magnesium oxide, a manganese tetroxide, an ilmenite, or a combination thereof having a first particle distribution range.

In some embodiments, a process for making a wellbore servicing fluid can include adding a liquid suspension composition of the type disclosed herein having a diutan gum; a viscosifier; a carrier fluid; and optionally a salt. Typically, the diutan gum is suspended in the liquid suspension composition to form a suspended diutan gum. Generally, the liquid suspension composition can be contacted with a base fluid, and other optional ingredients depending on the service to form a wellbore servicing fluid or treatment fluid. Such optional ingredients can include a weighting agent, a shale inhibitor, a cement, a proppant, and other ingredients depending on the service. Upon contact with a sufficient and/or effective amount of the base fluid, the suspended diutan gum is activated and hydrates, and the hydrated diutan gum then provides viscosification (e.g., thickening) and/or suspension enhancement (e.g., particulate suspension) to the wellbore servicing fluid or treatment fluid. The wellbore servicing fluid may be prepared using any suitable method and/or equipment, such as one or more blenders, mixers, and stirrers, in any order. In some embodiments, the wellbore servicing fluid may be prepared at least in part at a well site or at an offsite location.

In some embodiments, a method for making a well servicing fluid, includes combining a liquid suspension composition and a base fluid; and afterwards optional ingredients such a weighting agent, a shale inhibitor, a cement, a proppant, and other ingredients. Usually, the base fluid can include an aqueous fluid. Generally, the aqueous fluid may include fresh water, salt water, brine, seawater, or a combination thereof. The combining may include mixing the ingredients together for a sufficient period of time.

In some embodiments, a well servicing fluid of the type disclosed herein can be prepared using any suitable method, such as batch mixing or continuous mixing. In one or more aspects, the method includes mixing components (e.g., the aqueous fluid, the liquid suspension composition, base fluid, and optional one or more additives) of the well servicing fluid using mixing equipment (e.g., a jet mixer, a re-circulating mixer, a batch mixer, a blender, a mixing head of a solid feeding system) to form a pumpable fluid (e.g., a homogeneous fluid). For example, all components of the well servicing fluid may be added to a batch mixer and agitated until the desired amount of mixing is achieved. Alternatively, the drilling fluid may be added to a continuous mixer where components are metered in and a product of the drilling fluid is continuously withdrawn. If a pumpable cement slurry is formed, the liquid suspension composition may be added to an aqueous fluid prior to combining with the cement or to the combination of fluid and cement as the cement slurry is being pumped downhole. The drilling fluid may be mixed at elevated temperatures to aid in blending of the components and to produce a drilling fluid with desired viscosity, and other fluid properties. For example, the drilling fluid may be prepared at a temperature range of about 150° F. (66° C.) to about 200° F. (93° C.), about 150° F. (66° C.) to about 165° F. (74° C.), about 165° F. (74° C.) to about 175° F. (79° C.), or from 175° F. (79° C.) to about 200° F. (93° C.).

In some embodiments, a portion of the components of the drilling fluid is from an existing wellbore servicing fluid, such as a treating fluid recovered from the same or another well. Additional components (e.g., an aqueous fluid, a modified starch, calcium carbonate, one or more additives) can be added to the recovered wellbore servicing fluid to prepare the drilling fluid disclosed herein.

The wellbore servicing fluids may be prepared using any suitable method and/or equipment (e.g., blenders, mixers, stirrers, etc.) known in the art at any time prior to their use. The wellbore servicing fluids may be prepared at least in part at a well site or at an offsite location. In some embodiments, the shale inhibitors derived from plant material and/or other components of the wellbore servicing fluid may be metered directly into a base wellbore servicing fluid to form a wellbore servicing fluid. In some embodiments, the base fluid may be mixed with the shale inhibitors derived from plant material and/or other components of the wellbore servicing fluid at a well site where the operation or treatment is conducted, either by batch mixing or continuous ("on-the-fly") mixing. The term "on-the-fly" is used herein to include methods of combining two or more components wherein a flowing stream of one element is continuously introduced into a flowing stream of another component so that the streams are combined and mixed while continuing to flow as a single stream as part of the on-going treatment. Such mixing can also be described as "real-time" mixing. In other embodiments, the wellbore servicing fluids may be prepared, either in whole or in part, at an offsite location and transported to the site where the treatment or operation is conducted. In introducing a wellbore servicing fluid into a portion of a subterranean formation, the components of the wellbore servicing fluid may be mixed together at the surface and introduced into the formation together, or one or more components may be introduced into the formation at the surface separately from other components such that the components mix or intermingle in a portion of the formation to form a wellbore servicing fluid. In either such case, the wellbore servicing fluid is deemed to be introduced into at least a portion of the subterranean formation for purposes.

In some embodiments, methods for using the wellbore servicing fluids can conduct a variety of subterranean treatments, including but not limited to, hydraulic fracturing treatments, acidizing treatments, and drilling operations. In some embodiments, the wellbore servicing fluid such as a drilling fluid may be introduced into at least a portion of a well bore as it is drilled to penetrate at least a portion of a subterranean formation. The drilling fluid may be circulated in the well bore during drilling, among other reasons, to cool and/or lubricate a drill bit and/or drill pipe to prevent them from sticking to the walls of the wellbore, prevent blowouts by serving as a hydrostatic head to counteract the sudden entrance into the well bore of high pressure formation fluids, suspend or remove formation cuttings from the well bore, and/or enhance the stability of the well bore during drilling.

In some embodiments, a method of performing a wellbore servicing operation can include (a) transporting the liquid suspension composition comprising a suspended diutan gum of the type disclosed herein; a viscosifier; a carrier fluid; and optionally a salt to a location proximate to a well penetrating a subterranean formation; (b) contacting the liquid suspension composition with a base fluid to form a wellbore servicing fluid, wherein the base fluid is present in an amount effective to hydrate the diutan gum and form a hydrated diutan gum (and wherein the hydrated diutan gum is present in the wellbore servicing fluid in an amount effective to increase the viscosity of the wellbore servicing fluid, enhance the suspension (e.g., increase settling time) of particulates present in the wellbore servicing fluid, or both in comparison to an otherwise similar wellbore servicing fluid in the absence of the liquid suspension composition), and (c) placing the wellbore servicing fluid in the well. The wellbore servicing fluid can further include a particulate material, wherein the hydrated diutan gum is present in the wellbore servicing fluid in an amount effective to suspend the particulate material in the wellbore servicing fluid (e.g., in an amount effective to increase the settling time to a value sufficient to allow placement of the wellbore servicing fluid in the wellbore for its intended purpose (e.g., suspension of cement in a cement slurry used in a cement job; suspension of proppant in a fracturing fluid used in hydraulic fracturing operations; suspension of weighting agents or drill cuttings in a drilling fluid used during drilling operations)). In some embodiments, the location proximate to the well is an offshore platform or vessel.

The wellbore servicing fluid can be used in a variety services such as drilling, treating, cementing, fracturing, producing, gravel packing, and secondary or enhanced oil recovery operations. The wellbore servicing fluid can be a spacer fluid, a cementitious fluid, a fracturing fluid, a gravel packing fluid, a drilling fluid or any other fluid used for wellbore operations.

Generally, the liquid suspension composition can serve as a viscosification and/or suspension agent when used in a wellbore servicing fluid. In some embodiments, the liquid suspension composition can be a spacer or pill, e.g., for cementing. In some embodiments, a method can include contacting a liquid suspension composition with a base fluid to form a viscosified mixture at a location proximate a wellsite. Generally, the liquid suspension composition may include a suspended diutan gum; a viscosifier; an aqueous carrier fluid; and optionally a salt. The method can further include placing the viscosified mixture in a wellbore penetrating a subterranean formation. Often, the viscosified mixture can be positioned below a cement slurry and above a wellbore fluid while being placed into the wellbore.

In some embodiments, the liquid suspension composition can be a suspension agent for a cement in a method of cementing. The method can include contacting a liquid suspension composition with a base fluid to form a mixture at a location proximate a wellsite. Generally, the liquid suspension composition may include a suspended diutan gum; a viscosifier; an aqueous carrier fluid; and optionally a salt. The method can further include contacting the mixture with a cementitious material and optionally one or more additives, weighting agents or weight-reducing agents to form a cement slurry, placing the cement slurry in a wellbore penetrating a subterranean formation; and allowing the cement slurry to set to form a hardened mass.

In some embodiments, the liquid suspension composition can be a suspension agent for a fracturing fluid, such as for suspending proppants. In some embodiments, a method can include contacting a liquid suspension composition with a base fluid and at least one proppant to form a fracturing fluid at a location proximate a wellsite. Generally, the liquid suspension composition may include a suspended diutan gum; a viscosifier; an aqueous carrier fluid; and optionally a salt. The method can further include placing the fracturing fluid into a subterranean formation via a wellbore penetrating the subterranean formation.

In some embodiments, the liquid suspension composition can be a suspension agent for a drilling fluid, such as suspending drill cuttings. In some embodiments, a method can include contacting a liquid suspension composition with a base fluid, a clay, optionally one or more additives, and a weighting agent to form a drilling fluid at a location proximate a wellsite. Generally, the liquid suspension composition may include a suspended diutan gum; a viscosifier; an aqueous carrier fluid; and optionally a salt. The method may further include drilling a wellbore penetrating a subterranean formation with the drilling fluid. Often, the drilling fluid may be circulated through the wellbore and suspends and removes drill cuttings from the wellbore.

In one or more embodiments, the wellbore servicing fluid is used downhole at temperatures (e.g., a bottom hole circulating temperature, BHCT) ranging from about 20° F. to about 450° F., from about 20° F. to about 350° F., from about 20° F. to about 300° F., from about 20° F. to about 250° F., from about 20° F. to about 200° F., from about 25° F. to about 150° F., or from about 40° F. to about 100° F.

In some embodiments, a method can include: contacting a diutan gum and a viscosifier with a carrier fluid to form a liquid suspension composition of the type disclosed herein; contacting the liquid suspension composition, a base fluid, a cementitious material, a retarder, an accelerator, a fluid loss control additive, a dispersant, a viscosifier, a thixotropic additive, a silica compound and optionally one or more additives, weighting agents or weight-reducing agents to form a wellbore servicing fluid at a location proximate a wellsite; placing the wellbore servicing fluid in a wellbore penetrating a subterranean formation; and allowing the wellbore servicing fluid to set.

In some embodiments, the method can include: contacting a suspension composition, a base fluid, a cementitious material, and optionally one or more additives, weighting agents or weight-reducing agents to form a wellbore servicing fluid at a location proximate a wellsite, and placing the wellbore servicing fluid in a wellbore penetrating a subterranean formation; and allowing the wellbore servicing fluid to set. Generally, the liquid suspension composition may include a diutan gum, a viscosifier, and a carrier fluid.

The liquid suspension composition can be used in a variety of environments, such as on-shore and off-shore. In some embodiments, a method can include contacting a suspended diutan gum, a viscosifier; and a carrier fluid to form a liquid suspension composition, transporting the liquid suspension composition at a location proximate an offshore platform, contacting the liquid suspension composition with a base fluid to form a wellbore servicing fluid, and placing the wellbore servicing fluid in an offshore wellbore penetrating a subterranean formation. Generally, the base fluid can be present in an amount sufficient to hydrate the suspended diutan gum in the resultant wellbore servicing fluid.

In some embodiments, a method can include contacting a suspended diutan gum, a viscosifier; and a carrier fluid to form a liquid suspension composition, transporting the liquid suspension composition at a location proximate an offshore platform, and placing the liquid suspension composition in a wellbore servicing fluid in an offshore wellbore penetrating a subterranean formation. In some embodiments, the wellbore servicing fluid is from at about -20° C. to about 150° C., and independently, the wellbore servicing fluid can have an aerobic degradability of at least 21% after 28 days in seawater according to the Marine Bodis test as defined in Modified ISO 10708 test for the Marine Environment using guidance in the Harmonized Offshore Chemicals Notification Format (HOCNF) guidelines (Oslo and Paris Conventions (OSPAR) Agreement: 2012/05. Update 2015).

In some embodiments, the wellbore servicing fluid may include a cementitious material and may further include: contacting the base fluid and the liquid suspension composition to form a mixture, contacting the cementitious material retarder, an accelerator, a fluid loss control additive, a dispersant, a viscosifier, a thixotropic additive, one or more silica compounds and optionally a weighting agent or a weight-reducing agent with the mixture to form the wellbore servicing fluid having a cement slurry, pumping the cement slurry down the wellbore; and allowing the cement slurry to set to form a hardened mass. In some embodiments, the wellbore servicing fluid can include a cementitious material and the method can further include contacting the suspension composition, the base fluid, the cementitious material retarder, the accelerator, the fluid loss control additive, the dispersant, the viscosifier, the thixotropic additive, one or more silica compounds and optionally a weighting agent or a weight-reducing agent to form the wellbore servicing fluid comprising a cement slurry, pumping the cement slurry down the wellbore, and allowing the cement slurry to set to form a hardened mass.

The suspended material (e.g., diutan gum) in the liquid suspension composition can be suspended and subsequently hydrated. In some embodiments, a method for viscosifying a wellbore servicing fluid can include: contacting a viscosifier and a carrier fluid (aqueous or non-aqueous) to form a viscous liquid; contacting a diutan gum with the carrier fluid to form a liquid suspension composition comprising a suspended diutan gum; contacting the liquid suspension composition with an effective amount of a base fluid to hydrate the suspended diutan gum to form the wellbore servicing fluid; and placing the wellbore servicing fluid in a wellbore (e.g., offshore wellbore) penetrating a subterranean formation.

The wellbore servicing fluid including the liquid suspension composition may directly or indirectly affect one or more components or pieces of equipment associated with the preparation, delivery, recapture, recycling, reuse, and/or disposal of the wellbore servicing fluid. For example, and with reference to FIG. 1, the wellbore servicing fluid including the liquid suspension composition may directly or indirectly affect one or more components or pieces of equipment associated with an exemplary wellbore drilling assembly 100, according to one or more embodiments. It should be noted that while FIG. 1 generally depicts a land-based drilling assembly, those skilled in the art will readily recognize that the principles described herein are equally applicable to subsea drilling operations that employ floating or sea-based platforms and rigs, without departing from the scope of the disclosure.

As illustrated, the drilling assembly 100 may include a drilling platform 102 that supports a derrick 104 having a traveling block 106 for raising and lowering a drill string 108. The drill string 108 may include, but is not limited to, drill pipe and coiled tubing, as generally known to those skilled in the art. A kelly 110 supports the drill string 108 as it is lowered through a rotary table 112. A drill bit 114 is attached to the distal end of the drill string 108 and is driven either by a downhole motor and/or via rotation of the drill string 108 from the well surface. As the bit 114 rotates, it creates a borehole 116 that penetrates various subterranean formations 118.

A pump 120 circulates a wellbore servicing fluid 122 through a feed pipe 124 and to the kelly 110, which conveys the wellbore servicing fluid 122 downhole through the interior of the drill string 108 and through one or more orifices in the drill bit 114. The drilling fluid 122 is then circulated back to the surface via an annulus 126 defined between the drill string 108 and the walls of the borehole 116. At the surface, the recirculated or spent drilling fluid 122 exits the annulus 126 and may be conveyed to one or more fluid processing unit(s) 128 via an interconnecting flow line 130. After passing through the fluid processing unit(s) 128, a "cleaned" wellbore servicing fluid 122 is deposited into a nearby retention pit 132. While illustrated as being arranged at the outlet of the wellbore 116 via the annulus 126, those skilled in the art will readily appreciate that the fluid processing unit(s) 128 may be arranged at any other location in the drilling assembly 100 to facilitate its proper function, without departing from the scope of the scope of the disclosure.

One or more fluids may be added to the wellbore servicing fluid 122 via a mixing hopper 134 communicably coupled to or otherwise in fluid communication with the retention pit 132. The mixing hopper 134 may include, but is not limited to, mixers and related mixing equipment known to those skilled in the art. In other embodiments, however, fluids may be added to the wellbore servicing fluid 122 at any other location in the drilling assembly 100. In at least one embodiment, for example, there could be more than one retention pit 132, such as multiple retention pits 132 in series. Moreover, the retention pit 132 may be representative of one or more fluid storage facilities and/or units where wellbore servicing fluids may be stored, reconditioned, and/or regulated until added to the drilling fluid 122.

As mentioned above, the wellbore servicing fluid including the liquid suspension composition and additional aqueous fluid such as brine (hereinafter may be referred to as "wellbore servicing fluid") may directly or indirectly affect the components and equipment of the drilling assembly 100. For example, the wellbore servicing fluid including the liquid suspension composition and additional aqueous fluid such as brine may directly or indirectly affect the fluid processing unit(s) 128 which may include, but is not limited to, one or more of a shaker (e.g., shale shaker), a centrifuge, a hydrocyclone, a separator (including magnetic and electrical separators), a desilter, a desander, a separator, a filter (e.g., diatomaceous earth filters), a heat exchanger, and any fluid reclamation equipment. The fluid processing unit(s) 128 may further include one or more sensors, gauges, pumps, compressors, and the like used store, monitor, regulate, and/or recondition the exemplary wellbore servicing fluids.

The wellbore servicing fluid may directly or indirectly affect the pump 120, which representatively includes any conduits, pipelines, trucks, tubulars, and/or pipes used to fluidically convey the wellbore servicing fluids downhole, any pumps, compressors, or motors (e.g., topside or downhole) used to drive the wellbore servicing fluids into motion, any valves or related joints used to regulate the pressure or flow rate of the wellbore servicing fluids, and any sensors (i.e., pressure, temperature, flow rate, etc.), gauges, and/or a combination thereof, and the like. The wellbore servicing fluid may also directly or indirectly affect the mixing hopper 134 and the retention pit 132 and their assorted variations.

The wellbore servicing fluid may also directly or indirectly affect the various downhole equipment and tools that may come into contact with the wellbore servicing fluid such as, but not limited to, the drill string 108, any floats, drill collars, mud motors, downhole motors and/or pumps associated with the drill string 108, and any measurement-while-drilling (MWD)/logging-while-drilling (LWD) tools and related telemetry equipment, sensors or distributed sensors associated with the drill string 108. The wellbore servicing fluid may also directly or indirectly affect any downhole heat exchangers, valves and corresponding actuation devices, tool seals, packers and other wellbore isolation devices or components, and the like associated with the wellbore 116. The wellbore servicing fluid may also directly or indirectly affect the drill bit 114, which may include, but is not limited to, roller cone bits, polycrystalline diamond compact (PDC) bits, natural diamond bits, any hole openers, reamers, coring bits, etc.

While not specifically illustrated herein, the wellbore servicing fluid may also directly or indirectly affect any transport or delivery equipment used to convey the wellbore servicing fluids to the drilling assembly 100 such as, for example, any conduits, pipelines, trucks, tubulars, and/or pipes used to fluidically move the wellbore servicing fluids from one location to another, any pumps, compressors, or motors used to drive wellbore servicing fluids into motion, any valves or related joints used to regulate the pressure or flow rate of wellbore servicing fluids, and any sensors (i.e., pressure and temperature), gauges, and/or a combination thereof, and the like.

Figure 2:
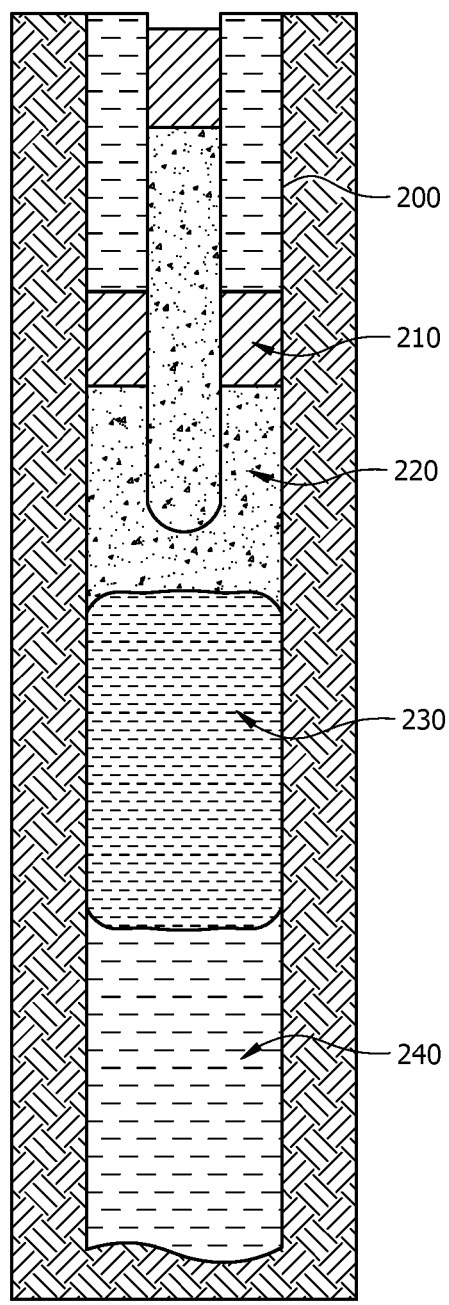
FIG. 2 is a schematic depiction of a wellbore operational environment in a subterranean formation during placement of a cement plug on top of suspension pill located in a wellbore fluid, typically drilling fluid.

In some embodiments, a wellbore servicing fluid of the present disclosure may function as a pill to aid a cementing operation for preventing the cement from falling through to the drilling fluid. Referring to FIG. 2, a wellbore 200 can have several fluids pump therein, such as a spacer fluid 210, a cement slurry 220 for a plug, a viscous water swellable pill 230, and a drilling fluid 240 that can include an oil-based mud. The viscous water swellable pill 230 can include the wellbore servicing fluid including the liquid suspension composition and a base fluid. Adding the base fluid in a sufficient amount can active the diutan gum in the liquid suspension composition to increase the viscosity of the viscous water swellable pill 230. The viscous water swellable pill 230 can secure the cement slurry 220 for a sufficient time to cure and form a plug in the wellbore 200.

EXAMPLES

The embodiments having been generally described, the following examples are given as particular embodiments of the disclosure and to demonstrate the practice and advantages thereof. It is understood that the examples are given by way of illustration and is not intended to limit the specification or the claims in any manner.

Example 1

Two samples are made by combining a viscosifier, a brine, and a diutan gum. The viscosifier is sold under the trade designation RM-1 NS and the diutan gum is sold under the trade designation SA-1015 both from Halliburton Company of Houston, Texas (hereinafter "SA"). The viscosifier includes xanthan gum. The brine includes a salt of potassium formate. The compositions of Samples 1 and 2 are depicted in Table 1 below:

TABLE 1

| Material | Unit of Measure | Sample #1 | Sample #2 |
|---|---|---|---|
| Potassium formate brine | milliliter (ml) | 1,000 | 1,000 |
| Viscosifier | gram (g) | 2 | 2 |
| Diutan gum | gram (g) | 100 | 150 |

Samples 1 and 2 are compared to several commercially available fluid loss additives, namely, Comparative Sample 1 (CS1), Comparative Sample 2 (CS2), and Comparative Sample 3 (CS3). Comparative Sample 1 is sold under the trade designation Halad-400L and Comparative Sample 2 is sold under the trade designation Halad-413L both from Halliburton Company of Houston, Texas, and Comparative Sample 3 is sold under the trade designation FDP-C1396-20 by Halliburton Company of Houston, Texas. Comparative Sample 1 includes about 10 to about 30 wt. % ethylene glycol and Comparative Sample 2 includes sodium hydroxide and acrylic resin. Viscosities of Samples 1 and 2 are compared over time and with the comparative samples in Table 2 below:

TABLE 2

| Revolution Per Minute (rpm) | Sample 1 (Day 1) | Sample 2 (Day 1) | Sample 2 (Day 18) | Sample 2 (Day 38) | CS1 | CS2 | CS3 |
|---|---|---|---|---|---|---|---|
| 300 | 109 | 206 | 300 | 300 | 300 | 300 | 170 |
| 200 | 82 | 153 | 300 | 300 | 300 | 300 | 126 |
| 100 | 51 | 94 | 194 | 195 | 179 | 300 | 76 |
| 60 | 37 | 66 | 143 | 143 | 110 | 300 | 54 |
| 30 | 25 | 43 | 96 | 97 | 57 | 169 | 35 |
| 6 | 10 | 17 | 41 | 42 | 12 | 38 | 17 |
| 3 | 3 | 13 | 30 | 32 | 6 | 19 | 14 |

As depicted in TABLE 2, the viscosities of the Samples 1 and 2 are comparable to commercially available CS1, CS2, and CS3, even after sitting for several days or weeks because Samples 1 and 2 stay in suspension maintaining their rheological properties.

Example 2

Figure 3:
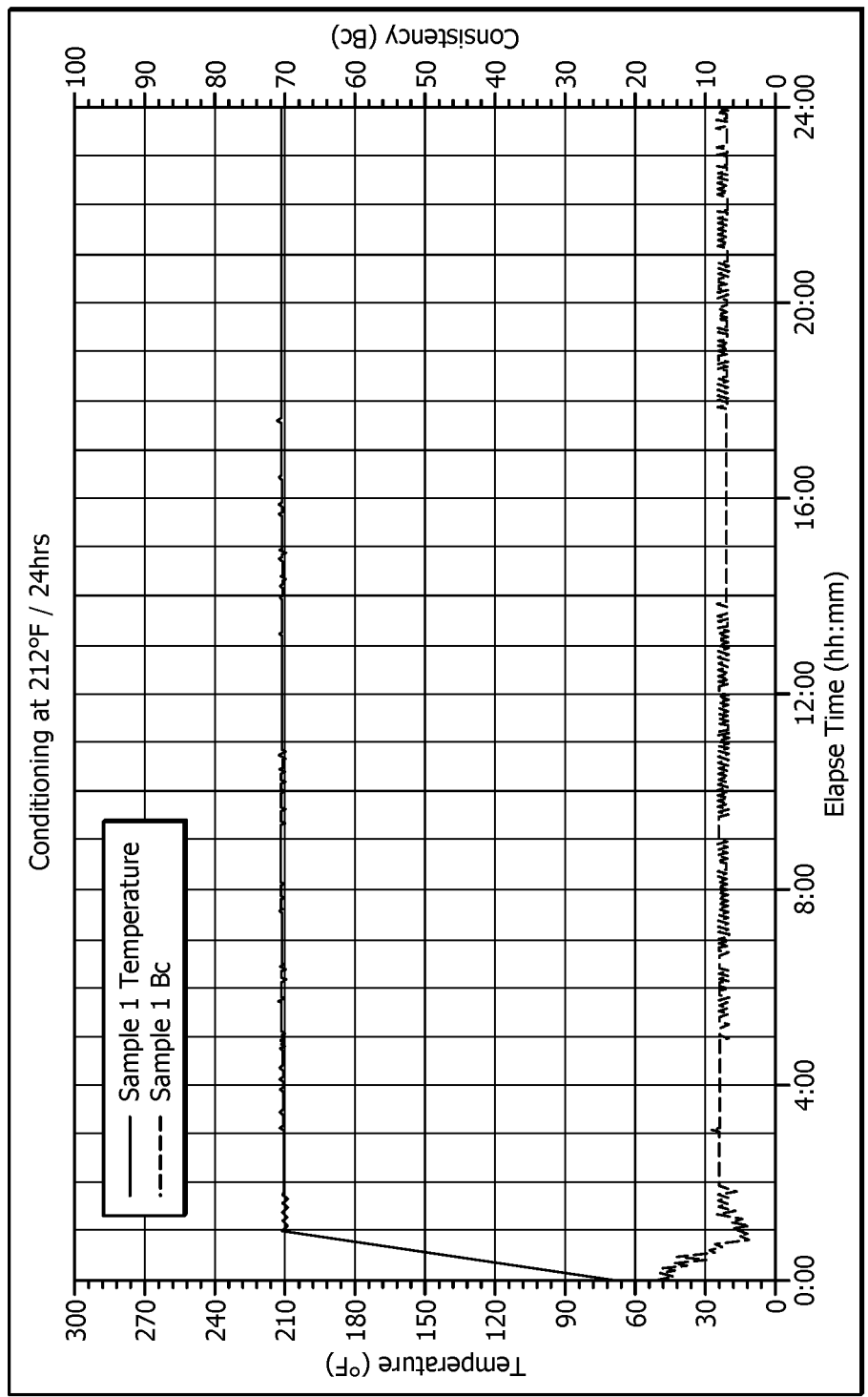
FIG. 3 depicts temperature conditioning of an embodiment of a substantially pure liquid suspension composition.

Referring to FIG. 3, the effects of temperature of Sample 1 are depicted. The top line is the liquid temperature and the dashed line is the consistency (Bc) of the liquid composition. Sample 1 is conditioned in a thickening time cup at 212° F. (100° C.) for 24 hours. The initial consistency (Bc) is 15 and the end consistency (Bc) is 8. During conditioning, there is indication of gelation and Sample 1 remains suspended when heated. After 24 hours, Sample 1 is cooled to 68° F. (20° C.) and the viscosity is measured again for 24 hours. At both temperatures, Sample 1 remains stable and in suspension. The effect on viscosity after conditioning for 24 hours at 100° C. as measured by in degrees at respective rpm using a rheometer sold under the trade designation FANN 35 by Fann Instrument Company of Houston, Texas (hereinafter FANN 35) is depicted in TABLE 3 below:

TABLE 3

| rpm | Sample 1 Viscosity Before Conditioning | Sample 1 Viscosity After Conditioning at 100° C. for 24 Hours (in degrees via a FANN 35 Rheometer) |
|---|---|---|
| 300 | 110 | 97 |
| 200 | 82 | 74 |
| 100 | 51 | 48 |
| 60 | 37 | 36 |
| 30 | 25 | 25 |
| 6 | 10 | 12 |
| 3 | 9 | 9 |

As depicted in Table 3, Sample 1 has similar viscosity before and after conditioning. In addition, Sample 1 is pourable after conditioning.

Example 3

Figure 4:
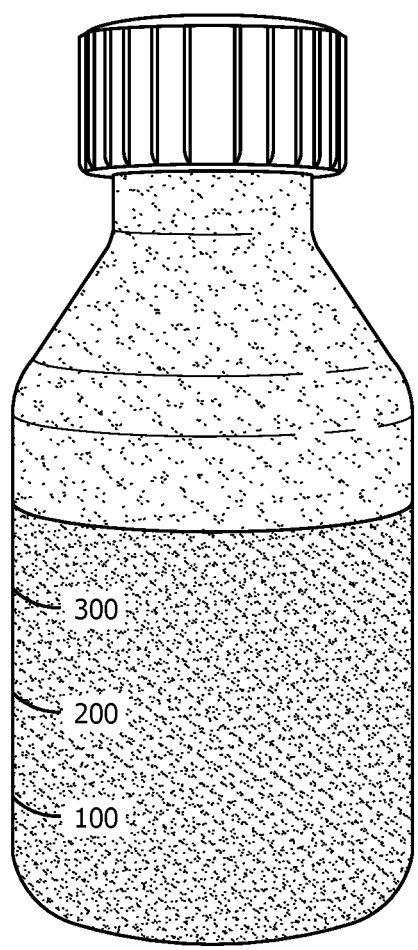
FIG. 4 depicts stability of an embodiment of a substantially pure liquid suspension composition after 45 days of storage at 68° F.
Figure 5:
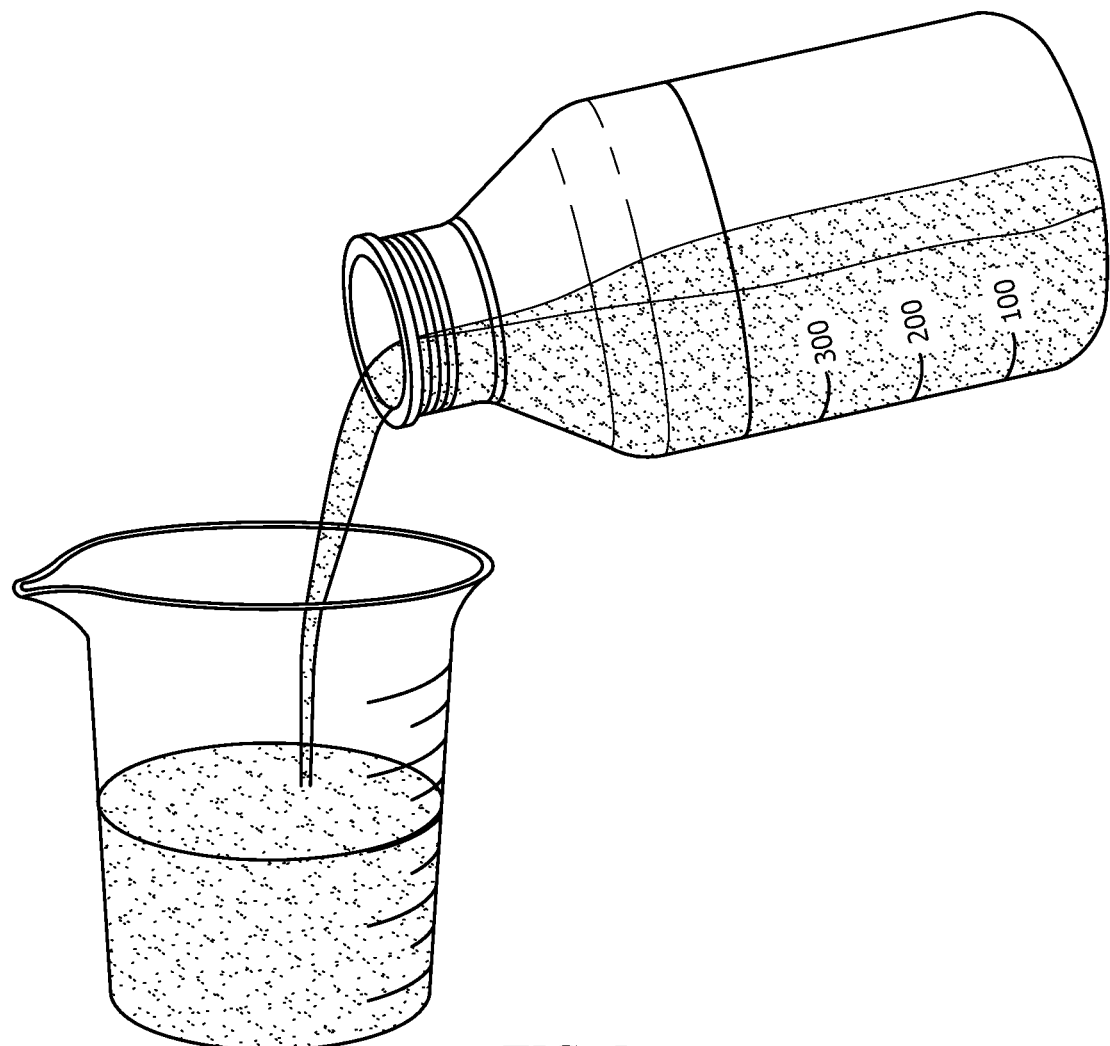
FIG. 5 depicts pourability of an embodiment of a liquid suspension composition after 45 days of storage at 68° F.

Referring to FIGS. 4-5, depicted the stability Sample 2 with respect to time after 45 days of storage. FIG. 4 depicts Sample 2 stable and still in suspension. Sample 2 has not separated and thus makes it suitable to prepare and ship to a wellsite for use. FIG. 5 depicts Sample 2 being pourable after 45 days of storage. Other observations have determined Sample 2 can remain stable and pourable after 120 days of storage.

Example 4

Sample 1 is added to a cement slurry and compared to a cement slurry absent any additives (a neat cement). Two sets of thickening time tests are performed on 1.92 specific gravity (SG) (16.02 pound mass (lbm) per gal). The two cement slurry samples (Cement Sample 1 (CS1) and Cement Comparative Sample 1 (CCS1)) are the same except Sample 1 has 10 volume percent (vol. %) of the liquid suspension composition of Sample 1. The cement can be sold under trade designation Dyckerhoff Class G from Dyckerhoff GmbH, of Wiesbaden, Germany (hereinafter may be referred to as "cement") and a defoamer can be sold under the trade designation NF-6 from Halliburton Company of Houston, TX (hereinafter may be referred to as "defoamer"). In the Tables 4 and 5 below is the formula of the neat cement and test conditions:

TABLE 4

| Materials | Units | Amount |
|---|---|---|
| Cement | % BWOC | 100.00 |
| Fresh Water | liter (l) per 100 kilogram (kg) | 42.87 |
| Defoamer | l/100 kg | 0.10 |

TABLE 5

| Test conditions | Parameter |
|---|---|
| Test temperature | 68° F. |
| Heating time | 60 minutes |
| Pressure | 2,900 pounds per square inch (psi) |

Figure 6:
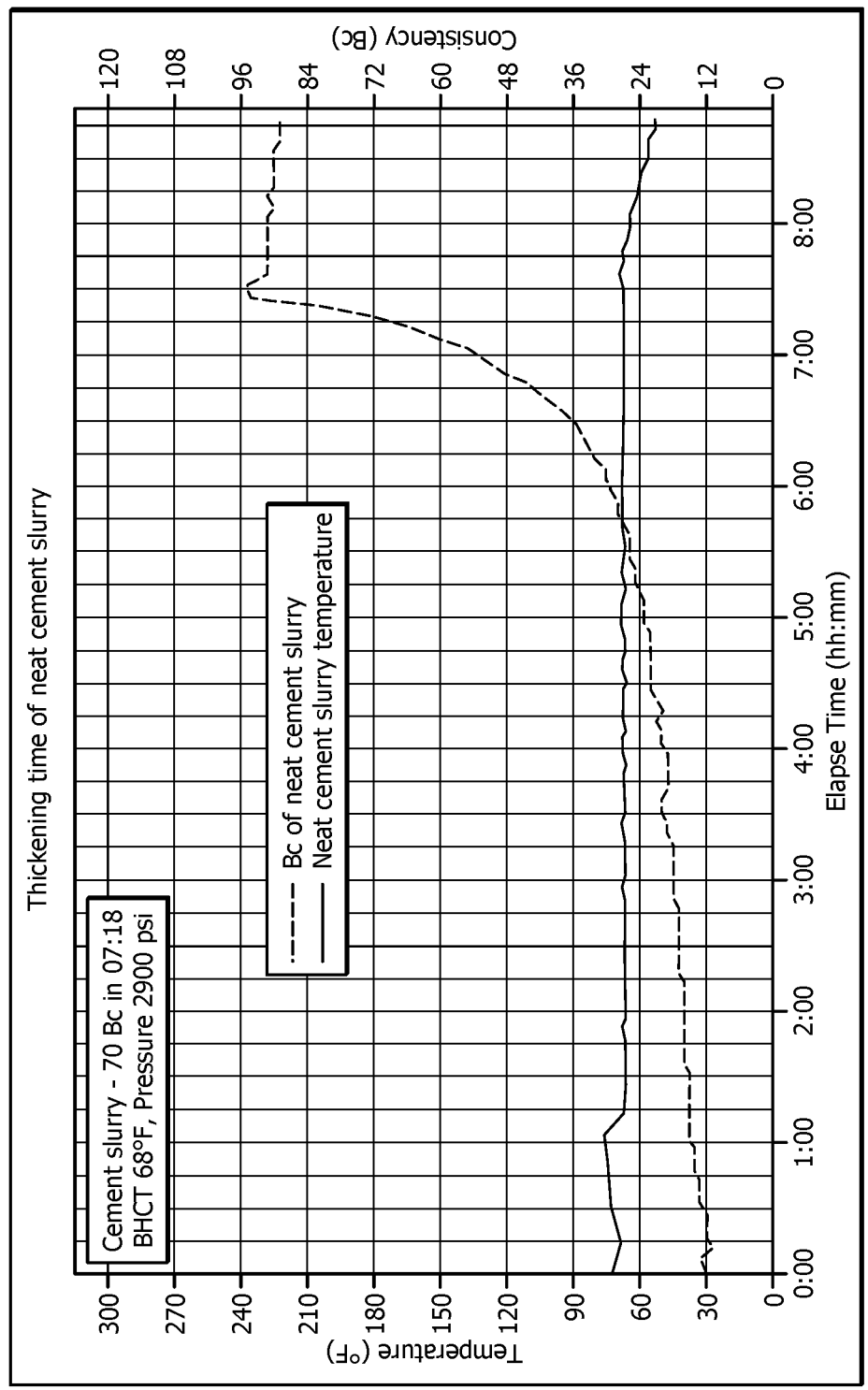
FIG. 6 is a graphical depiction of a typical thickening time test of a neat cement slurry.
Figure 7:
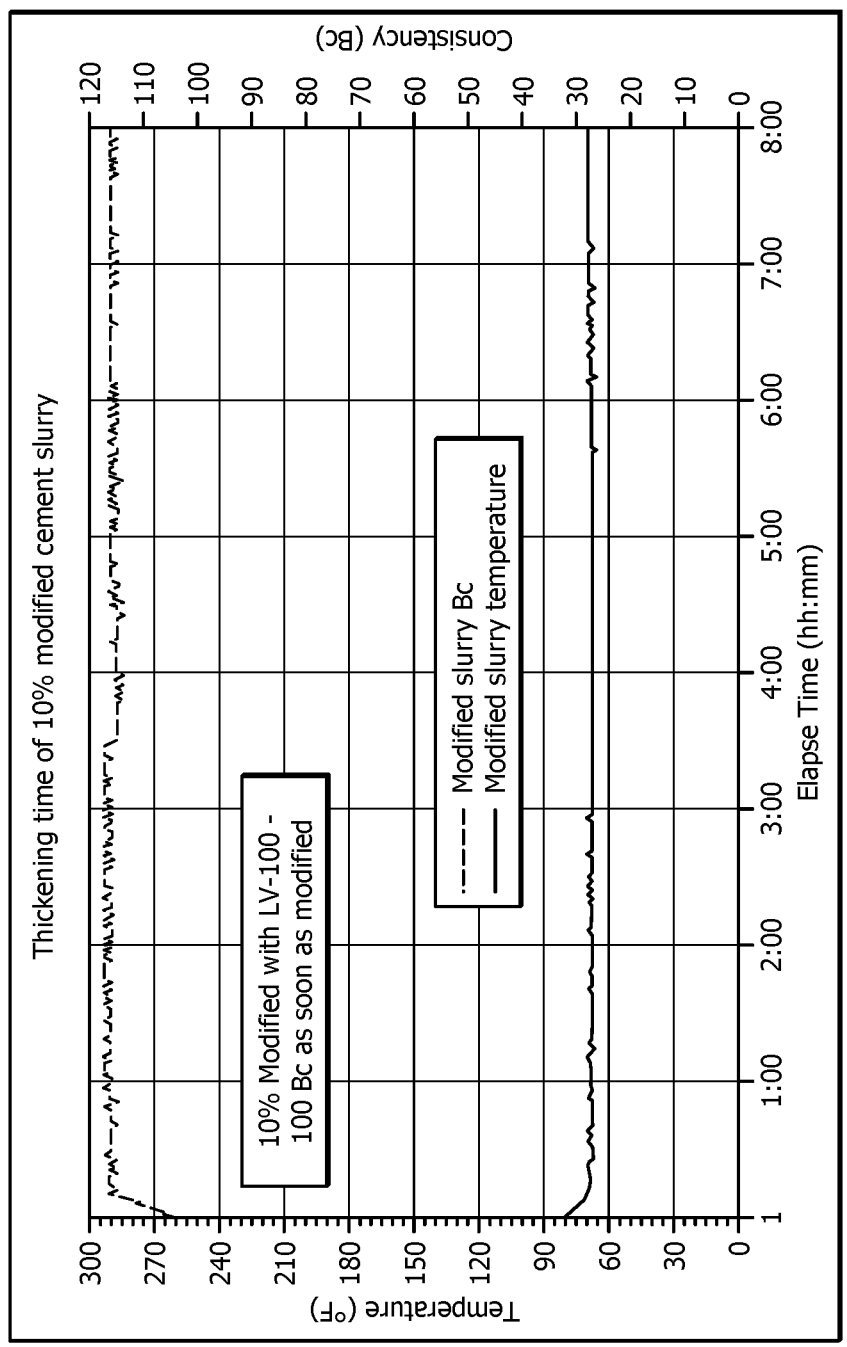
FIG. 7 is a graphical depiction of a thickening time of same cement slurry containing 10%, by volume, of an embodiment of a liquid suspension composition.

An amount of 500 milliliter (ml) of (neat) cement slurry of CCS1 is placed in a separate thickening time cup. Sample 1 of liquid suspension composition in an amount of 50 ml (10 vol. %) is injected into a 500 ml cup and then thickening time cup is filled with the cement slurry and the thickening time is started. Referring to FIGS. 6 and 7, the initial Bc and thickening time of the cement slurry is 12 and 70 Bc at 7 hour and 18 minutes for CCS1, as depicted in FIG. 6. In this figure, the dashed line represents Bc and the solid line represents the slurry temperature. However, the initial Bc increased instantly to 100 after adding 10 volume % with Sample 1 to CS1 (modified slurry), as depicted in FIG. 7. In this figure, the dashed line represents Bc and the solid line represents the modified slurry temperature, which has a volume ratio of 9:1 of cement slurry to Sample 1. Thus, the consistency of CS1 is higher even at initial conditions as compared to CCS1. Moreover, the rapid increase in CS1 cement slurry viscosity can ensure minimal intermixing with drilling fluids, such as an oil-based mud.

Example 5

Sample 2 of the liquid suspension composition is placed in a water cement slurry (CS2) and compared to an equivalent amount of diutan gum SA placed in a water cement slurry (comparative SA cement slurry (CSACS). As Sample 2 is in the form of a liquid and SA is in the form of a powder, the following table shows the conversions to have equivalent amounts of Sample 2 and SA in a cement slurry.

TABLE 6

| SA Percent By Weight of Cement (BWOC) | Sample 2 gallon (gal) per sack (sk) | Sample 2 liter per 100 kilogram |
|---|---|---|
| 0.1 | 0.08 | 0.73 |
| 0.2 | 0.17 | 1.47 |
| 0.3 | 0.25 | 2.20 |
| 0.4 | 0.33 | 2.93 |
| 0.6 | 0.50 | 4.40 |
| 0.8 | 0.66 | 5.86 |
| 1.0 | 0.83 | 7.33 |

The performance of CS2 is compared with CSACS as a water extended cement slurry. CS is 12.52 lbm/gal (1.50 SG) cement slurry with 1.50 L Sample 2 per 100 kg cement slurry and CSACS is 12.52 lbm/gal (1.50 SG) cement slurry with 0.2% BWOC SA. The test conditions are depicted below in Table 7:

TABLE 7

| Test conditions | Parameter |
|---|---|
| Test temperature | 140° F. |
| Heating time | 60 minutes |
| Pressure | 2,500 pounds per square inch (psi) |

The properties, materials and performance of CS2 and CSACS are compared in TABLE 8 below:

TABLE 8

| | CS2 | CSACS |
|---|---|---|
| Slurry | | |
| Slurry density, SG | 1.50 | 1.50 |
| Slurry density, lbm/gal | 12.52 | 12.52 |
| Materials | | |
| Cement, % BWOC | 100 | 100 |
| Fresh water, l/100 kg | 104.08 | 103.92 |
| Defoamer, l/100 kg | 0.10 | 0.10 |
| CSACS, % BWOC | | 0.20 |
| Sample 2, l/100 kg | 1.50 | |
| CaCl$_2$ brine, l/100 kg | 4.00 | 4.00 |
| Mix rheology | Deflection (°) right after mixing | |
| 300 | 39 | 36 |
| 200 | 32 | 29 |
| 100 | 25 | 22 |
| 60 | 22 | 19 |
| 30 | 18 | 17 |
| 6 | 14 | 13 |
| 3 | 13 | 12 |
| American Petroleum Institute (API) at 140° F. | Deflection (°) after 30 minutes conditioning | |
| 300 | 66 | 57 |
| 200 | 60 | 52 |
| 100 | 53 | 46 |
| 60 | 50 | 43 |
| 30 | 45 | 40 |
| 6 | 33 | 28 |
| 3 | 28 | 23 |
| Free Fluid API 10B-2, 0° Inclination | 0 | 0 |
| Thickening time at 140° F. | | |
| 50 Bc, hour (hr) | 3.6 | 3.9 |
| Ultrasonic Cement Analyzer (UCA) Compressive Strength at 140° F. | | |
| Time for 50 psi, hr | 4.5 | 4.6 |
| 24 hr Compressive | 276 | 261 |

TABLE 8-continued

|  | CS2 | CSACS |
| --- | --- | --- |
| Strength, psi Thickening time at 104° F. - Temperature sensitivity | | |
| 50 Bc, hour UCA Compressive Strength -Temperature Sensitivity | 9.8 | 9.0 |
| Time for 50 psi, hr | 6.7 | 7.7 |
| 24 hr Compressive Strength, psi | 349 | 279 |

From the data in Table 8, CS2 has similar, if not superior properties, as compared to CSACS. As such, a cement have the additive of Sample 2 performs well as a cement additive.

Example 6

Figure 8:
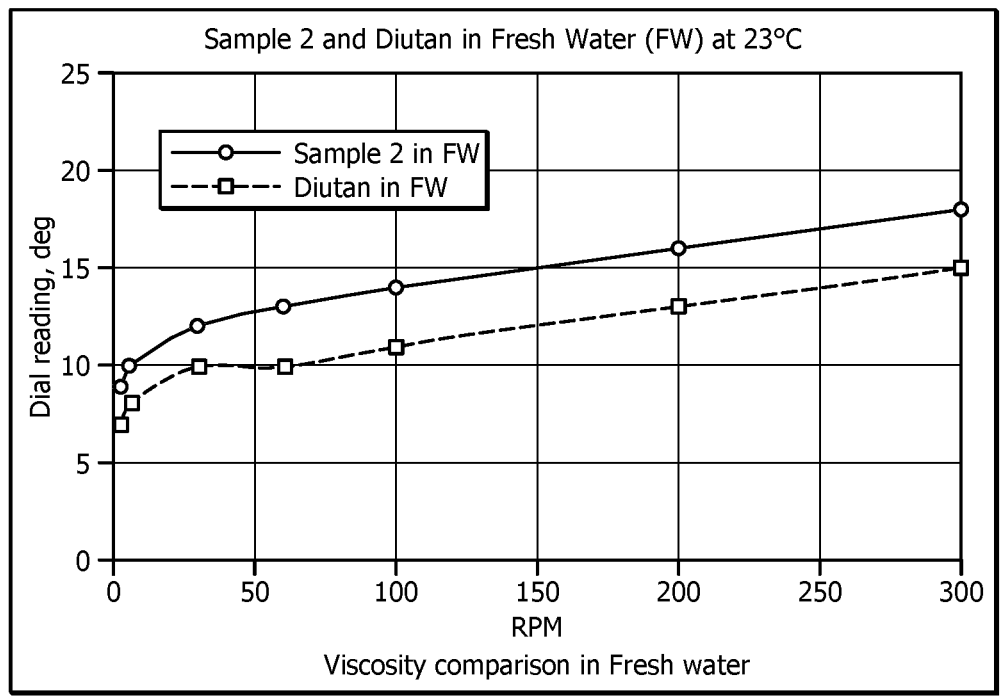
FIG. 8 is a viscosity comparison of a polysaccharide suspending agent and an embodiment of a liquid suspension composition in fresh water.
Figure 9:
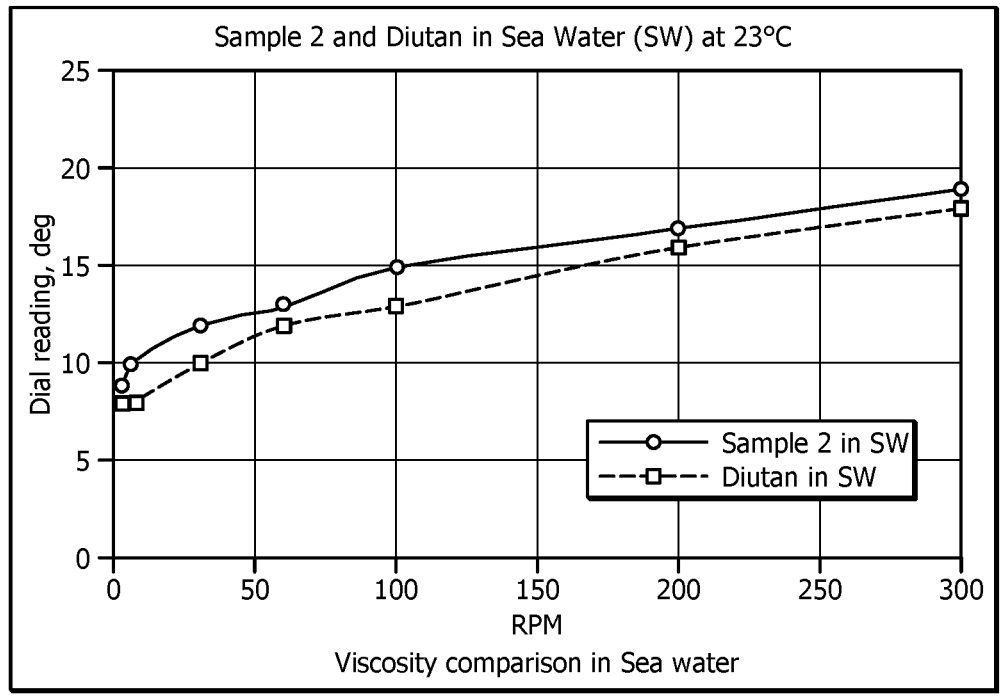
FIG. 9 is a viscosity comparison of a polysaccharide suspending agent and an embodiment of a liquid suspension composition in sea water.

Two samples are made using 0.25 diutan (SA) in fresh water and an equivalent amount of Sample 2 in a fresh water (1.84 l per 100 kg) or 0.25 SA equivalent. Additionally, two samples are made using 0.25 diutan (SA) in salt water and an equivalent amount of Sample 2 in a salt water (1.84 l per 100 kg) or 0.25 SA equivalent. The samples are measured for viscosity in fresh water (FIG. 8) and salt water (FIG. 9) at 23° C. As depicted in FIGS. 8 and 9, the viscosity is similar for both in fresh water and seawater with Sample 2 having a slightly better performance in both fresh and salt water.

Example 7

To determine whether the suspended diutan in the liquid additive is not substantially hydrated, four samples are made by adding diutan (D) by weight in fresh water (FW), by volume, and a viscosified brine (VB) including potassium formate (KCOOH) and xanthan gum, by volume. In other words, the samples are made by adding the weight of solute in, e.g., grams, in volume of solvent, e.g., 100 ml (wt/vol) and multiplied by 100 percent. Viscosity measurements are made using a FANN 35 at 3 and 6 rpm. Below is Table 9 depicting the four examples and a control of a viscosified brine (VB).

TABLE 9

| Viscosity | 1<br>0.25%<br>wt/vol<br>D in FW | 2<br>0.5%<br>wt/vol<br>D in FW | 3<br>VB | 4<br>10%<br>wt/vol<br>D in VB | 5<br>Viscosity<br>Difference<br>Columns 4<br>and 3 | 6<br>15%<br>wt/vol<br>D in VB | 7<br>Viscosity<br>Difference<br>Columns 6<br>and 3 |
| --- | --- | --- | --- | --- | --- | --- | --- |
| 3 rpm, cP | 681 | 1168 | 389 | 876 | 487 | 1266 | 877 |
| 6 rpm, cP | 389 | 633 | 292 | 487 | 195 | 828 | 536 |

The determination of "not substantially hydrated" is on a basis of diutan in fresh water (e.g., diutan is expected to fully hydrate in fresh water and thus is used as the basis for comparison). As an example, the difference between the viscosity of a control of VB and diutan in VB (columns 5 and 7) is compared to the viscosity of diutan in fresh water (columns 1 and 2). As an example, the columns 1 and 2 exhibit diutan at 0.25% wt/vol and 0.5% wt/vol in fresh water being substantially hydrated with viscosities of 681 cP and 1168 cP at 3 rpm and 389 cP and 633 cP at 6 rpm. The difference in column 5 at 3 rpm and 6 rpm of, respectively, 487 cP and 195 cP of 10% wt/vol diutan in viscosified brine is below the ranges of 681 cP to 1168 cP at the row of 3 rpm and 389 cP to 633 cP at the row of 6 rpm, and thus the 10% wt/vol diutan in viscosified brine is not substantially hydrated. Moreover, the difference of the viscosity of 877 cP at 3 rpm, column 7 is between 681 cP and 1168 cP at 3 rpm. Thus, the sample having 15% wt/vol diutan in vicosified brine corresponds to a 0.25% to 0.5% wt/vol of diutan in fresh water and is not substantially hydrated. Similarly, the difference of the viscosity of 536 cP at 6 rpm, column 7, is between 389 cP and 633 cP at 6 rpm. Thus, the sample having 15% wt/vol diutan in vicosified brine corresponds to 0.25% to 0.5% wt/vol of diutan in fresh water and is not substantially hydrated.

Example 8

The effect of water addition to a liquid additive including a diutan suspension results in the hydration of the diutan. Particularly, a 5% wt/vol diutan in a potassium formate (KCOOH) brine is mixed in a blender sold under the trade designation WARING® by Conair Corporation of Stamford Connecticut for five minutes at 4,000 rpm with varying amounts water, as depicted in TABLE 10. The blending is conducted at standard temperature (68° F.) and pressure (one atmosphere). The amount of water is expressed as volume of water added divided by the volume of diutan suspension (vol/vol) multiplied by 100%.

TABLE 10

| | Water Addition (vol/vol) in Percent (%) | | | | | | |
| --- | --- | --- | --- | --- | --- | --- | --- |
| | 0 | 10 | 15 | 20 | 25 | 30 | 35 |
| Viscosity at 3 rpm, cP | 97 | 195 | 487 | 876 | 2629 | 6815 | Gel |
| Viscosity at 6 rpm, cP | 97 | 146 | 292 | 535 | 1412 | 3554 | Gel |

In this example, water is sequentially added in incrementally increasing amounts starting at 10% vol/vol to 35% vol/vol. As the water amount increases, the hydration of diutan also increases and after exceeding 30% vol/vol, the suspension transitions from fluid to viscous fluid and to a gel. Thus, the suspended diutan becomes hydrated and the diutan can transition from being a "hibernated viscosifier" to a viscosifier after water exceeds 10% vol/vol and transfers to a gel after exceeding 30% vol/vol.

ADDITIONAL DISCLOSURE

The following are non-limiting, specific embodiments in accordance with the present disclosure:

A first embodiment which is a liquid suspension composition for wellbore operations comprises: a diutan gum; a viscosifier; and a carrier fluid, wherein the diutan gum is suspended in the liquid suspension composition to form a suspended diutan gum.

A second embodiment which is the liquid suspension composition of the first embodiment further comprising a salt.

A third embodiment which is the liquid suspension composition of the first or second embodiment wherein the salt comprises an alkali metal salt or an alkaline metal salt.

A fourth embodiment which is the liquid suspension of any of the proceeding embodiments wherein the salt comprises a formate salt or a chloride salt.

A fifth embodiment which is the liquid suspension of any of the proceeding embodiments wherein the salt comprises sodium formate, potassium formate, cesium formate, or a combination thereof.

A sixth embodiment which is the liquid suspension of any of the proceeding embodiments wherein the carrier fluid comprises an aqueous fluid.

A seventh embodiment which is the liquid suspension of any of the proceeding embodiments wherein the carrier fluid comprises an aqueous fluid and the salt comprises potassium formate.

An eighth embodiment which is the liquid suspension of any of the proceeding embodiments wherein the viscosifier comprises a guar gum, a xanthan gum, a welan gum, a hydroxyethyl cellulose, a modified cellulose or a derivative thereof, a diatomaceous earth, a starch, a modified starch, a crosslinked starch, a viscoelastic surfactant, an attapulgite clay, or a combination thereof.

A ninth embodiment which is the liquid suspension of any of the proceeding embodiments wherein the viscosifier comprises a xanthan gum.

A tenth embodiment which is the liquid suspension of any of the proceeding embodiments wherein the suspended diutan gum is not substantially hydrated and the xanthan gum is substantially hydrated in the carrier fluid.

An eleventh embodiment which is the liquid suspension of any of the proceeding embodiments wherein the suspended diutan gum is at least partially hydrated in the salt and the xanthan gum is substantially hydrated in the carrier fluid.

A twelfth embodiment which is the liquid suspension of any of the proceeding embodiments wherein the suspended diutan gum is in an amount from about 1 to about 50 weight percent based on the total weight of the liquid suspension composition and wherein the viscosifier is in an amount from about 0.1 to about 20 weight percent based on the total weight of the liquid suspension composition.

A thirteenth embodiment which is the liquid suspension of any of the proceeding embodiments wherein the suspended diutan gum is in an amount from about 1 to about 50 weight percent based on the total weight of the liquid suspension composition, about 2 to about 30 weight percent based on the total weight of the liquid suspension composition, or about 5 to about 15 weight percent based on the total weight of the liquid suspension composition.

A fourteenth embodiment which is the liquid suspension of any of the proceeding embodiments wherein the viscosifier is in an amount from about 0.1 to about 20 weight percent, about 0.5 to about 10 weight percent, or about 0.5 to about 5 weight percent based on the total weight of the liquid suspension composition.

A fifteenth embodiment which is the liquid suspension of any of the proceeding embodiments wherein the liquid suspension composition has an aerobic degradability of at least 21% after 28 days in seawater according to the Marine Bodis test as defined in Modified ISO 10708 test for the Marine Environment using guidance in the HOCNF guidelines (OSPAR Agreement: 2012/05. Update 2015).

A sixteenth embodiment which is the liquid suspension of any of the proceeding embodiments wherein the liquid suspension composition has a specific gravity of from about 0.5 to about 2.3.

A seventeenth embodiment which is the liquid suspension of any of the proceeding embodiments wherein the liquid suspension composition has an initial Brookfield viscosity of no more than about 500 cP at 24° C. and 100 rpm.

An eighteenth embodiment which is the liquid suspension of any of the proceeding embodiments wherein the liquid suspension composition has an initial Brookfield viscosity of no more than about 400 cP at 24° C. and 100 rpm.

A nineteenth embodiment which is the liquid suspension of any of the proceeding embodiments wherein the liquid suspension composition has an initial a Brookfield viscosity of no more than about 300 cP at 24° C. and 100 rpm.

A twentieth embodiment which is the liquid suspension of any of the proceeding embodiments wherein the liquid suspension composition remains suspended without visually perceptible component separation for at least about 45 days.

A twenty-first embodiment which is the liquid suspension of any of the proceeding embodiments wherein the liquid suspension composition remains suspended without visually perceptible component separation for at least about 90 days.

A twenty-second embodiment which is the liquid suspension of any of the proceeding embodiments wherein the diutan does not substantially hydrate in brine in amount of no more than about 1.0% weight of hydrated diutan per volume of brine (wt/vol times 100%), about 0.75% wt/vol, about 0.50 wt/vol, or about 0.25% wt/vol based on the hydration of diutan in fresh water (e.g., as determined from viscosity measurements obtained from a FANN 35).

A twenty-third embodiment which is a wellbore servicing fluid comprising the liquid suspension composition of any of the proceeding embodiments and a base fluid. A twenty-fourth embodiment which is the wellbore servicing fluid of any of the proceeding wellbore servicing fluid embodiments wherein the base fluid comprises fresh water, salt water, brine, seawater, an oleaginous fluid, a hydrocarbon fluid, an oil, or a combination thereof.

A twenty-fifth embodiment which is the wellbore servicing fluid of any of the proceeding wellbore servicing fluid embodiments wherein the wellbore servicing fluid comprises from about 0.1 to about 25 weight percent of the diutan gum based on the weight of the wellbore servicing fluid.

A twenty-sixth embodiment which is the wellbore servicing fluid of any of the proceeding wellbore servicing fluid embodiments further comprising a particulate material selected from the group consisting of a cementitious material, a proppant, a weighting agent, drill cuttings, and any combination thereof.

A twenty-seventh embodiment which is the wellbore servicing fluid of any of the proceeding wellbore servicing fluid embodiments comprising an amount of a base fluid effective to hydrate the diutan gum to form a hydrated diutan gum, and wherein the hydrated diutan gum is present in the wellbore servicing fluid in an amount effective to suspend the particulate material.

A twenty-eighth embodiment which is a wellbore servicing fluid comprising the liquid suspension composition of any of the proceeding embodiments.

A twenty-ninth embodiment which is a wellbore servicing fluid comprising the liquid suspension composition of any of the proceeding embodiments and a base fluid.

A thirtieth embodiment which is a wellbore servicing fluid of the twenty-ninth embodiment wherein the base fluid comprises fresh water, salt water, brine, seawater, water-based drilling fluid, non-aqueous drilling fluid or a combination thereof.

A thirty-first embodiment which is a wellbore servicing fluid of the twenty-ninth embodiment or the twenty-ninth embodiment wherein the base fluid is present in the wellbore servicing fluid in an amount effective to substantially hydrate the suspended diutan gum to form a viscosified pill.

A thirty-second embodiment which is a wellbore servicing fluid of any of the twenty-ninth embodiment through thirty-first embodiment wherein the wellbore servicing fluid comprises from about 0.5 to about 25 weight percent of the suspended diutan gum, about 1 to about 15 weight percent of the suspended diutan gum, or about 2 to about 8 weight percent of the suspended diutan gum based on the weight of the wellbore servicing fluid.

A thirty-third embodiment which is a wellbore servicing fluid of any of the twenty-ninth embodiment through thirty-second embodiment wherein the wellbore servicing fluid comprises from about 1 to about 100 weight percent of the liquid suspension composition, about 10 to about 100 weight percent of the liquid suspension composition, or about 50 to about 100 weight percent of the liquid suspension composition based on the weight of the wellbore servicing fluid.

A thirty-fourth embodiment which is a wellbore servicing fluid of any of the twenty-ninth embodiment through thirty-third embodiment wherein a sufficient amount of fluid to hydrate can be at least about 10% vol/vol, about 15% vol/vol, about 20% vol/vol, about 25% vol/vol, about 30% vol/vol, about 35% vol/vol, or about 40% vol/vol of water or other aqueous fluid to the volume of the liquid suspension composition.

A thirty-fifth embodiment which is a wellbore servicing fluid of any of the twenty-ninth embodiment through thirty-fourth embodiment wherein a sufficient amount of fluid to hydrate the diutan can be at about 20% to about 40% vol/vol or about 25% to about 35% vol/vol.

A thirty-sixth embodiment which is a wellbore servicing fluid of the twenty-third embodiment further comprising a particulate material.

A thirty-seventh embodiment which is a wellbore servicing fluid of the thirty-sixth embodiment wherein the particulate material comprises a cementitious material.

A thirty-eighth embodiment which is a wellbore servicing fluid of the thirty-seventh embodiment wherein the cementitious material comprises a Portland cement, a pozzolana cement, a gypsum cement, a shale cement, an acid cement, a base cement, a phosphate cement, a high alumina content cement, a slag cement, a silica cement, a high alkalinity cement, a magnesia cement, a lime, or a combination thereof.

A thirty-ninth embodiment which is a wellbore servicing fluid of the thirty-seventh embodiment or the thirty-eighth embodiment wherein the cementitious material is present in the wellbore servicing fluid in an amount of from about 1% to about 85%, about 10% to about 60%, or about 20% to about 40% based on a total weight of the wellbore servicing fluid.

A fortieth embodiment which is a wellbore servicing fluid of any of the thirty-seventh embodiment through the thirty-ninth embodiment comprising an effective amount of base fluid to hydrate the suspended diutan gum.

A forty-first embodiment which is a wellbore servicing fluid of any of the thirty-seventh embodiment through the thirty-fortieth embodiment wherein the base fluid is present in an amount sufficient to form a pumpable cement slurry with the cementitious material.

A forty-second embodiment which is a wellbore servicing fluid of the fortieth embodiment or the forty-first embodiment wherein the base fluid is present in an amount of at least about 15 liter of water per 100 kilogram weight of the cementitious material.

A forty-third embodiment which is a wellbore servicing fluid of any of the thirty-seventh embodiment through the forty-second embodiment wherein the wellbore servicing fluid comprises from about 0.5 to about 50 weight percent of the suspended diutan gum, about 2 to about 30 weight percent of the suspended diutan gum, or about 5 to about 15 weight percent of the suspended diutan gum based on the weight of the wellbore servicing fluid (e.g., cement slurry).

A forty-fourth embodiment which is a wellbore servicing fluid of any of the thirty-seventh embodiment through the forty-third embodiment wherein the wellbore servicing fluid comprises from about 1 to about 100 weight percent of the liquid suspension composition, about 10 to about 100 weight percent of the liquid suspension composition, or about 50 to about 100 weight percent of the liquid suspension composition based on the weight of the wellbore servicing fluid (e.g., cement slurry).

A forty-fifth embodiment which is a wellbore servicing fluid of any of the thirty-seventh embodiment through the forty-fourth embodiment wherein the wellbore servicing fluid is operable at a temperature of from about 0° C. to about 150° C.

A forty-sixth embodiment which is a wellbore servicing fluid of any of the thirty-seventh embodiment through the forty-fifth embodiment further comprising a defoamer, a retarder, an accelerator, a fluid loss control additive, a dispersant, a viscosifier, a thixotropic additive, a silica compound or a combination thereof.

A forty-seventh embodiment which is a wellbore servicing fluid of the thirty-sixth embodiment wherein the particulate material comprises a proppant.

A forty-eighth embodiment which is a wellbore servicing fluid of the forty-seventh embodiment comprising an effective amount of base fluid to hydrate the suspended diutan gum and suspend the proppant.

A forty-ninth embodiment which is a wellbore servicing fluid of the forty-seventh embodiment or the forty-eighth embodiment wherein the wellbore servicing fluid comprises from about 1 to about 50 weight percent of the suspended diutan gum, about 2 to about 30 weight percent of the suspended diutan gum, or about 5 to about 15 weight percent of the suspended diutan gum based on the weight of the wellbore servicing fluid (e.g., fracturing fluid).

A fiftieth embodiment which is a wellbore servicing fluid of any of the forty-seventh embodiment through the forty-ninth embodiment wherein the wellbore servicing fluid comprises from about 1 to about 100 weight percent of the liquid suspension composition, about 10 to about 100 weight percent of the liquid suspension composition, or about 50 to about 100 weight percent of the liquid suspension composition based on the weight of the wellbore servicing fluid (e.g., fracturing fluid).

A fifty-first embodiment which is a wellbore servicing fluid of the thirty-sixth embodiment wherein the particulate material comprises a weighting agent, drill cuttings, or both.

A fifty-second embodiment which is a wellbore servicing fluid of the fifty-first embodiment comprising an effective amount of base fluid to hydrate the suspended diutan gum and suspend the weighting agent, drilling cuttings, or both.

A fifty-third embodiment which is a wellbore servicing fluid of the fifty-first embodiment or the fifty-second embodiment wherein the wellbore servicing fluid comprises from about 1 to about 50 weight percent of the suspended diutan gum, about 2 to about 30 weight percent of the suspended diutan gum, or about 5 to about 15 weight percent of the suspended diutan gum based on the weight of the wellbore servicing fluid (e.g., drilling fluid).

A fifty-fourth embodiment which is a wellbore servicing fluid of any of the fifty-first embodiment through the fifty-third embodiment wherein the wellbore servicing fluid comprises from about 1 to about 100 weight percent of the liquid suspension composition, about 10 to about 100 weight percent of the liquid suspension composition, or about 50 to about 100 weight percent of the liquid suspension composition based on the weight of the wellbore servicing fluid (e.g., drilling fluid).

A fifty-fifth embodiment, which is a method of making a liquid suspension composition for wellbore operations, the method comprises: contacting a diutan gum, a viscosifier, and a carrier fluid to form the liquid suspension composition, wherein the diutan gum is suspended in the liquid suspension composition to form a suspended diutan gum.

A fifty-sixth embodiment which is the method of the fifty-fifth embodiment further comprising contacting a salt with the diutan gum, the viscosifier, and the carrier fluid to form the liquid suspension composition.

A fifty-seventh embodiment which is the method of the fifty-sixth embodiment wherein (i) the salt is a solid prior to contacting the diutan gum, the viscosifier, and the carrier fluid or (ii) the salt and the carrier fluid are in the form of a brine prior to contacting the diutan gum and the viscosifier.

A fifty-eighth embodiment which is the method of any of the fifty-fifth embodiment through the fifty-seventh embodiment wherein the viscosifier comprises a xanthan gum.

A fifty-ninth embodiment, which is a method of performing a wellbore servicing operation, the method comprises: (a) transporting the liquid suspension composition of any of the proceeding embodiments to a location proximate to a well penetrating a subterranean formation; (b) contacting the liquid suspension composition with a base fluid to form a wellbore servicing fluid, wherein the base fluid is present in an amount effective to hydrate the diutan gum and form a hydrated diutan gum, and (c) placing the wellbore servicing fluid in the well.

A sixtieth embodiment which is the method of the fifty-ninth embodiment wherein the wellbore servicing fluid further comprises a particulate material, wherein the hydrated diutan gum is present in the wellbore servicing fluid in an amount effective to suspend the particulate material in the wellbore servicing fluid, and wherein the location proximate to the well is an offshore platform or vessel.

A sixty-first embodiment, which is a method, the method comprises: a) contacting a liquid suspension composition with a base fluid to form a viscosified mixture at a location proximate a wellsite, wherein the liquid suspension comprises a suspended diutan gum, a viscosifier, and an aqueous fluid; and b) placing the viscosified mixture in a wellbore penetrating a subterranean formation, wherein the viscosified mixture is positioned below a cement slurry and above a wellbore fluid while being placed into the wellbore.

A sixty-second embodiment, which is a method, the method comprises: a) contacting a liquid suspension composition with a base fluid to form a mixture at a location proximate a wellsite, wherein the liquid suspension composition comprises a suspended diutan gum; a viscosifier; and an aqueous fluid; b) contacting the mixture with a cementitious material and optionally one or more additives, weighting agents or weight-reducing agents to form a cement slurry; c) placing the cement slurry in a wellbore penetrating a subterranean formation; and d) allowing the cement slurry to set to form a hardened mass.

A sixty-third embodiment, which is a method, the method comprises: a) contacting a liquid suspension composition with a base fluid and at least one proppant to form a fracturing fluid at a location proximate a wellsite, wherein the liquid suspension composition comprises a suspended diutan gum; a viscosifier; and an aqueous fluid; and b) placing the fracturing fluid into a subterranean formation via a wellbore penetrating the subterranean formation.

A sixty-fourth embodiment, which is a method, the method comprises: a) contacting a liquid suspension composition with a base fluid, clay, optionally one or more additives, and a weighting agent to form a drilling fluid at a location proximate a wellsite, wherein the liquid suspension composition comprises a suspended diutan gum; a viscosifier; and an aqueous fluid; and b) drilling a wellbore penetrating a subterranean formation with the drilling fluid, wherein the drilling fluid is circulated through the wellbore and suspends and removes drill cuttings from the wellbore.

A sixty-fifth embodiment, which is a method, the method comprises: a) contacting a suspended diutan gum, a viscosifier; and a carrier fluid to form a liquid suspension composition; b) transporting the liquid suspension composition at a location proximate an offshore platform; c) contacting the liquid suspension composition with a base fluid to form a wellbore servicing fluid, wherein the base fluid is present in an amount sufficient to hydrate the suspended diutan gum, and d) placing the wellbore servicing fluid in an offshore wellbore penetrating a subterranean formation.

A sixty-sixth embodiment, which is a method, the method comprises: a) contacting a suspended diutan gum, a viscosifier; and a carrier fluid to form a liquid suspension composition; b) transporting the liquid suspension composition at a location proximate an offshore platform; and c) placing a wellbore servicing fluid comprising the liquid suspension composition in an offshore wellbore penetrating a subterranean formation.

A sixty-seventh embodiment which is a method of the sixty-fifth embodiment or the sixty-sixth embodiment wherein the wellbore servicing fluid is from at about −20° C. to about 150° C.

A sixty-eighth embodiment which is a method of any of the sixty-fifth embodiment through the sixty-seventh embodiment wherein the wellbore servicing fluid has an aerobic degradability of at least 21% after 28 days in seawater according to the Marine Bodis test as defined in Modified ISO 10708 test for the Marine Environment using guidance in the HOCNF guidelines (OSPAR Agreement: 2012/05. Update 2015).

A sixty-ninth embodiment which is a method of any of the sixty-fifth embodiment through the sixty-eighth embodiment wherein the wellbore servicing fluid comprises a cementitious material and further comprising: a) contacting the base fluid and the liquid suspension composition to form a mixture; contacting the cementitious material retarder, an accelerator, a fluid loss control additive, a dispersant, a viscosifier, a thixotropic additive, one or more silica compounds and optionally a weighting agent or a weight-reducing agent with the mixture to form the wellbore servicing fluid comprising a cement slurry; and b) pumping the cement slurry down the wellbore; and allowing the cement slurry to set to form a hardened mass.

A seventieth embodiment which is a method of any of the sixty-fifth embodiment through the sixty-ninth embodiment wherein the wellbore servicing fluid comprises a cementitious material and further comprising: a) contacting the suspension composition, the base fluid, the cementitious material retarder, an accelerator, a fluid loss control additive, a dispersant, a viscosifier, a thixotropic additive, one or more silica compounds and optionally a weighting agent or a weight-reducing agent to form the wellbore servicing fluid comprising a cement slurry; b) pumping the cement slurry down the wellbore; and c) allowing the cement slurry to set to form a hardened mass.

A seventy-first embodiment which is a method for viscosifying a wellbore servicing fluid, the method comprises: a) contacting a viscosifier and a carrier fluid, aqueous or non-aqueous to form a viscous liquid; b) contacting a diutan gum with the carrier fluid to form a liquid suspension composition comprising a suspended diutan gum; c) placing the wellbore servicing fluid in an offshore wellbore penetrating a subterranean formation; or contacting the liquid suspension composition with an effective amount of a base fluid to hydrate the suspended diutan gum to form the wellbore servicing fluid; and d) placing the wellbore servicing fluid in an offshore wellbore penetrating a subterranean formation.

A seventy-second embodiment which is the method of the seventy-first embodiment further comprising placing the wellbore servicing fluid into a wellbore penetrating a subterranean formation.

A seventy-third embodiment which is the method of the seventy-first embodiment or the seventy-second embodiment wherein the wellbore servicing fluid is a spacer fluid, a cementitious fluid, a fracturing fluid, or a drilling fluid.

A seventy-fourth embodiment, which is a method, the method comprises: a) contacting a diutan gum and a viscosifier with a carrier fluid to form a liquid suspension composition; contacting the liquid suspension composition, a base fluid, a cementitious material, a retarder, an accelerator, a fluid loss control additive, a dispersant, a viscosifier, a thixotropic additive, a silica compound and optionally one or more additives, weighting agents or weight-reducing agents to form a wellbore servicing fluid at a location proximate a wellsite; b) placing the wellbore servicing fluid in a wellbore penetrating a subterranean formation; and c) allowing the wellbore servicing fluid to set.

A seventy-fifth embodiment, which is a method, the method comprises: a) contacting a suspension composition, a base fluid, a cementitious material, and optionally one or more additives, weighting agents or weight-reducing agents to form a wellbore servicing fluid at a location proximate a wellsite, wherein the liquid suspension composition comprises a diutan gum, a viscosifier, and a carrier fluid; placing the wellbore servicing fluid in a wellbore penetrating a subterranean formation; and b) allowing the wellbore servicing fluid to set.

A seventy-sixth embodiment, which is a method of performing a wellbore servicing operation, the method comprises: (a) transporting a liquid suspension composition to a location proximate to a well penetrating a subterranean formation, wherein the liquid suspension composition comprises: a diutan gum; a viscosifier; and a carrier fluid, wherein the diutan gum is suspended in the liquid suspension composition to form a suspended diutan gum; (b) contacting the liquid suspension composition with a base fluid to form a wellbore servicing fluid, wherein the base fluid is present in an amount effective to hydrate the diutan gum and form a hydrated diutan gum; and (c) placing the wellbore servicing fluid in the well.

While embodiments of the disclosure have been shown and described, modifications thereof can be made by one skilled in the art without departing from the spirit and teachings of the disclosure. The embodiments described herein are exemplary only, and are not intended to be limiting. Many variations and modifications of the disclosure disclosed herein are possible and are within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_L$, and an upper limit, $R_U$, is disclosed, any number falling within the range is specifically disclosed. In particular, the following numbers within the range are specifically disclosed: $R=R_L+k*(R_U-R_L)$, wherein k is a variable ranging from 1 percent to 100 percent with a 1 percent increment, i.e., k is 1 percent, 2 percent, 3 percent, 4 percent, 5 percent, 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. When a feature is described as "optional," both embodiments with this feature and embodiments without this feature are disclosed. Similarly, the present disclosure contemplates embodiments where this feature is required and embodiments where this feature is specifically excluded. Both alternatives are intended to be within the scope of the claim. Use of broader terms such as includes, includes, having, etc. should be understood to provide support for narrower terms such as consisting of, consisting essentially of, included substantially of, etc.

Accordingly, the scope of protection is not limited by the description set out above but is only limited by the claims which follow, that scope including all equivalents of the subject matter of the claims. Each and every claim is incorporated into the specification as an embodiment of the present disclosure. Thus, the claims are a further description and are an addition to the embodiments of the present disclosure.

What is claimed is:

1. A wellbore servicing fluid comprising:
   a liquid suspension composition for wellbore operations comprising:
      a diutan gum;
      a viscosifier; and
      a carrier fluid comprising brine; and
   a base fluid,
      wherein, prior to contacting the base fluid, the diutan gum is suspended in the liquid suspension composition to form a suspended diutan gum, which is not substantially hydrated, wherein the not substantially hydrated diutan gum has about 1.0% to about 15% weight of diutan gum per volume of brine, and wherein an amount of the base fluid is effective to hydrate the diutan gum to form a hydrated diutan gum, and wherein the hydrated diutan gum is present in the wellbore servicing fluid in an amount effective to suspend a particulate material.

2. The wellbore servicing fluid of claim 1, wherein the carrier fluid further comprises an aqueous fluid.

3. The wellbore servicing fluid of claim 1, wherein the viscosifier comprises a xanthan gum.

4. The wellbore serving fluid of claim 1, further comprising the particulate material selected from the group consisting of a cementitious material, a proppant, a weighting agent, drill cuttings, and any combination thereof.

5. The wellbore serving fluid of claim 1, wherein the wellbore servicing fluid is a cement slurry, a spacer fluid, or a drilling fluid.

6. The wellbore servicing fluid of claim 1, wherein the viscosifier comprises a guar gum, a xanthan gum, a welan gum, a hydroxyethyl cellulose, a modified cellulose or a derivative thereof, a diatomaceous earth, a starch, a modified starch, a crosslinked starch, a viscoelastic surfactant, an attapulgite clay, or a combination thereof.

7. The wellbore servicing fluid of claim 6, wherein the viscosifier comprises the xanthan gum and the xanthan gum is substantially hydrated in the carrier fluid.

8. The wellbore servicing fluid of claim 7, wherein the suspended diutan gum is in the amount from about 1 to about 50 weight percent based on a total weight of the liquid suspension composition and wherein the viscosifier is in an amount from about 0.1 to about 20 weight percent based on the total weight of the liquid suspension composition.

9. The wellbore servicing fluid of claim 1, wherein the brine comprises a salt selected from the group consisting of an alkali metal salt, an alkaline metal salt, a formate salt, a chloride salt, sodium formate, potassium formate, cesium formate, and a combination thereof.

10. The wellbore servicing fluid of claim 9, wherein the salt comprises the alkali metal salt or the alkaline metal salt.

11. The wellbore servicing fluid of claim 9, wherein the salt comprises the formate salt or the chloride salt.

12. The wellbore servicing fluid of claim 9, wherein the salt comprises the sodium formate, the potassium formate, the cesium formate, or a combination thereof.

13. The wellbore servicing fluid of claim 9, wherein the carrier fluid further comprises an aqueous fluid and the salt comprises potassium formate.

14. A method of making a liquid suspension composition for wellbore operations comprising:
contacting a diutan gum, a viscosifier, and a carrier fluid comprising brine to form the liquid suspension composition,
wherein the diutan gum is suspended in the liquid suspension composition to form a suspended diutan gum, which is not substantially hydrated, wherein the not substantially hydrated diutan gum has about 1.0% to about 15% weight of diutan gum per volume of brine; and
contacting the liquid suspension composition with a base fluid to form a wellbore servicing fluid, wherein the base fluid is present in an amount effective to hydrate the diutan gum and form a hydrated diutan gum, and wherein the hydrated diutan gum is present in the wellbore servicing fluid in an amount effective to suspend a particulate material.

15. The method of claim 14, further comprising contacting a salt comprised in the brine with the diutan gum, the viscosifier, and the carrier fluid to form the liquid suspension composition.

16. The method of claim 15, wherein (i) the salt is a solid prior to contacting the diutan gum, the viscosifier, and the carrier fluid or (ii) the salt and the carrier fluid are in the form of a liquid brine prior to contacting the diutan gum and the viscosifier.

17. The method of claim 14, wherein the base fluid comprises fresh water, salt water, brine, seawater, an oleaginous fluid, a hydrocarbon fluid, an oil, or a combination thereof.

18. The method of claim 14, wherein the wellbore servicing fluid comprises from about 0.1 to about 25 weight percent of the diutan gum based on a weight of the wellbore servicing fluid.

19. The method of claim 14, further comprising the particulate material selected from the group consisting of a cementitious material, a proppant, a weighting agent, drill cuttings, and any combination thereof.

20. The method of claim 14, wherein the wellbore servicing fluid is a cement slurry, a spacer fluid, or a drilling fluid.

21. A method of performing a wellbore servicing operation, comprising:
(a) transporting a liquid suspension composition to a location proximate to a well penetrating a subterranean formation, wherein the liquid suspension composition comprises:
a diutan gum;
a viscosifier; and
a carrier fluid comprising brine,
wherein the diutan gum is suspended in the liquid suspension composition to form a suspended diutan gum, which is not substantially hydrated, wherein the not substantially hydrated diutan gum has about 1.0% to about 15% weight of diutan gum per volume of brine;
(b) contacting the liquid suspension composition with a base fluid to form a wellbore servicing fluid, wherein the base fluid is present in an amount effective to hydrate the diutan gum and form a hydrated diutan gum; and
(c) placing the wellbore servicing fluid in the well.

22. The method of claim 21, further comprising contacting a salt comprised in the brine with the diutan gum, the viscosifier, and the carrier fluid to form the liquid suspension composition.

23. The method of claim 21, wherein the base fluid comprises fresh water, salt water, brine, seawater, an oleaginous fluid, a hydrocarbon fluid, an oil, or a combination thereof.

24. The method of claim 21, wherein the wellbore servicing fluid is a cement slurry, a spacer fluid, or a drilling fluid.

* * * * *